(12) United States Patent
Okazaki

(10) Patent No.: US 9,034,464 B2
(45) Date of Patent: May 19, 2015

(54) SINGLE LAYER FILM AND HYDROPHILIC MATERIAL COMPRISING THE SAME

(75) Inventor: Koju Okazaki, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/812,779

(22) PCT Filed: Jul. 25, 2011

(86) PCT No.: PCT/JP2011/066804
§ 371 (c)(1),
(2), (4) Date: Jan. 28, 2013

(87) PCT Pub. No.: WO2012/014829
PCT Pub. Date: Feb. 2, 2012

(65) Prior Publication Data
US 2013/0156959 A1   Jun. 20, 2013

(30) Foreign Application Priority Data

Jul. 29, 2010   (JP) ................ 2010-170696

(51) Int. Cl.
C08G 75/24 (2006.01)
C08F 2/38 (2006.01)
C09D 4/00 (2006.01)
C08J 7/04 (2006.01)
C08F 222/10 (2006.01)

(52) U.S. Cl.
CPC . *C08G 75/24* (2013.01); *C08F 2/38* (2013.01); *C09D 4/00* (2013.01); *C08F 222/1006* (2013.01); *C08J 7/047* (2013.01)

(58) Field of Classification Search
CPC ................................ C08F 8/34; C08G 75/24
USPC .................. 526/287, 288, 321, 323.1, 323.2; 528/363, 364, 376
See application file for complete search history.

(56) References Cited

U.S. PATENT DOCUMENTS

| | | |
|---|---|---|
| 3,024,221 A | 3/1962 | Le Fevre et al. |
| 3,759,985 A | 9/1973 | Nukina et al. |
| 3,847,846 A | 11/1974 | Asada |
| 4,274,933 A | 6/1981 | Kamada et al. |

(Continued)

FOREIGN PATENT DOCUMENTS

| | | |
|---|---|---|
| EP | 1 955 782 A1 | 8/2008 |
| JP | B 49-036214 | 9/1974 |

(Continued)

OTHER PUBLICATIONS

Machine translation of JP 2009-073923 A (Apr. 9, 2009).*

(Continued)

*Primary Examiner* — Vu A Nguyen
(74) *Attorney, Agent, or Firm* — Foley & Lardner LLP

(57) ABSTRACT

There is stably provided a hydrophilic cured product, such as a single-layer film, in which anionic hydrophilic groups are concentrated at a surface that is in contact with the air and which is excellent in transparency and adhesion to a substrate and tends to be rarely cracked. The hydrophilic cured product or single-layer film comprising a resin composition is produced by applying a mixture containing a polyvalent monomer (II) having two or more (meth) acryloyl groups and a compound (IV) having a specific group and a sulfonic acid group to a substrate or the like, drying the mixture if necessary, and then performing polymerization.

9 Claims, 1 Drawing Sheet

(56) References Cited

U.S. PATENT DOCUMENTS

| | | | |
|---|---|---|---|
| 4,437,836 | A | 3/1984 | Schmitz-Josten et al. |
| 6,024,895 | A | 2/2000 | Shimizu et al. |
| 2004/0042994 | A1 | 3/2004 | Dausch et al. |
| 2006/0165934 | A1 | 7/2006 | Okazaki et al. |
| 2007/0026342 | A1 | 2/2007 | Fromson et al. |
| 2009/0191373 | A1 | 7/2009 | Okazaki et al. |
| 2009/0208678 | A1 | 8/2009 | Van Baak et al. |
| 2010/0240563 | A1* | 9/2010 | Jaynes et al. .................. 510/180 |
| 2011/0008630 | A1 | 1/2011 | Okazaki et al. |

FOREIGN PATENT DOCUMENTS

| | | | |
|---|---|---|---|
| JP | B 51-009732 | | 3/1976 |
| JP | B 53-010636 | | 4/1978 |
| JP | A 55-090516 | | 7/1980 |
| JP | 58-52303 | | 3/1983 |
| JP | A 63-284157 | | 11/1988 |
| JP | A 08-325524 | | 12/1996 |
| JP | A 11-115305 | | 4/1999 |
| JP | A 2001-098007 | | 4/2001 |
| JP | 2001-343746 | A | 12/2001 |
| JP | T 2002-521140 | | 7/2002 |
| JP | 2004-514000 | | 5/2004 |
| JP | 2008-255072 | | 10/2008 |
| JP | 2009-502574 | A | 1/2009 |
| JP | 2009-073923 | | 4/2009 |
| JP | 2009-545663 | A | 12/2009 |
| JP | 2010-91660 | | 4/2010 |
| WO | WO 97/07167 | A1 | 2/1997 |
| WO | WO 00/06214 | | 2/2000 |
| WO | WO 2004/058900 | A1 | 7/2004 |
| WO | WO 2007/064003 | A1 | 6/2007 |
| WO | WO-2009/116612 | A1 | 9/2009 |

OTHER PUBLICATIONS

Office Action in CN Appln No. 201180035803.5 dated Jan. 28, 2014.
International Search Report issued in related International Patent Application No. PCT/JP2011/066804, completed Oct. 18, 2011.
Toagosei Annual Report of Research, "Trend", 1999, pp. 39-44 w/English Translation.
Polymer (Kobunshi), vol. 44, No. 5, p. 307 (1995) with English Translation.
Expected Materials for the Future, (Mirai Zairyo), vol. 2, No. 1, pp. 36-41 (2002) with English Translation.
W.Y. Chen et al., "Surface Characteristics of Polysulfoalkyl Methacrylates", Journal of Colloid and Interface Science, vol. 110, No. 2, Apr. 1996, pp. 468-476.
Office Action received in Japanese Patent Application No. 2012-526485 dated Jun. 17, 2014.
Extended European Search Report dated Oct. 9, 2014 issued in Application No. 11812419.7.
Japanese Office Action dated Feb. 24, 2015 issued in Application No. 2012-526485.

* cited by examiner

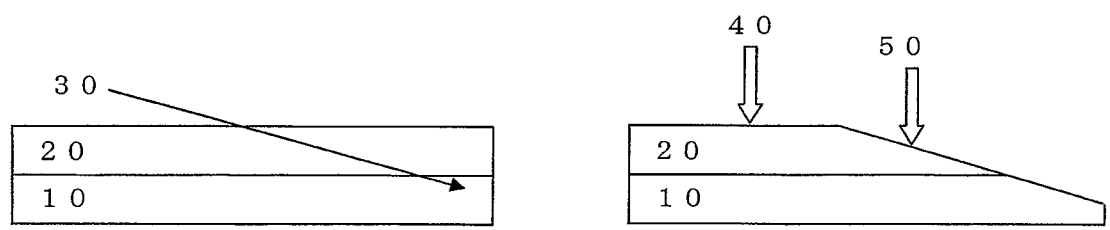

SINGLE LAYER FILM AND HYDROPHILIC MATERIAL COMPRISING THE SAME

TECHNICAL FIELD

The present invention relates to hydrophilic cured products such as a single-layer film, which are excellent in antifogging properties, antifouling properties and antistatic properties. More particularly, the present invention relates to hydrophilic cured products such as a single-layer film and a laminate including the single-layer film, which are obtained by polymerizing a mixture containing specific compounds and in which the concentration of anionic hydrophilic groups is inclined in the film thickness direction.

BACKGROUND ART

In recent years, a demand for improvement in fogging and fouling occurring on substrate surfaces such as a plastic surface and a glass surface has increased.

As a technique to solve this problem of fogging, an antifogging coating material obtained by adding a reactive surface active agent to an acrylic oligomer has been proposed, and a cured product film obtained from this antifogging coating material has been improved in hydrophilicity and water absorption properties (see, for example, non patent literature 1). As a technique to solve the problem of fouling, there has been noted an antifouling material having self-cleaning properties (antifouling properties) that hydrophilicity of a surface is improved to allow dart (hydrophobic substance in the outside air, etc.) having adhered to an outer wall or the like to come out by means of rain fall or showering of water, and thereby the dart is efficiently removed (see, for example, non patent literature 2 and non patent literature 3).

As typical resins having hydrophilicity, a large number of resins having many hydroxyl groups in a molecule, such as polyvinyl alcohol, are known. These resins having hydrophilicity exhibit different properties due to a difference in their chemical structures, and therefore, development of products suited for the properties have been made.

As other resins having hydrophilicity, there have been studied, for example, a polymer described in a patent literature 1, which is obtained by using 3-sulfopropyl methacrylate potassium salt, 2-acrylamido-2-methylpropanesulfonic acid sodium salt and polyethylene glycol diacrylate; a polymer described in a patent literature 2, which is obtained by using 3-sulfopropyl methacrylate sodium salt and long-chain urethane diacrylate (manufactured by Shin-Nakamura Chemical Co., Ltd., trade name "NK Oligo UA-W2A"); a polymer described in a patent literature 3, which is obtained by using 2-sulfoethyl acrylate, tetrahydrofurfuryl acrylate, trimethylolpropane acrylate and spiroglycol urethane diacrylate; a polymer described in a patent literature 4, which is obtained by using 2-sulfoethyl methacrylate and/or (meth)acrylate having phosphoric acid group and an epoxy resin; a polymer described in a non patent literature 4, which is obtained by using hydroxyethyl methacrylate, sufoalkylene (C6 to C10) methacrylate and methylene bisacrylamide; and a polymer described in a patent literature 8, which is obtained by using sulfonic acid-based (meth)acrylate, phosphoric acid-based (meth)acrylate, polyvalent (meth)acrylate and an ethanolamine-based compound.

In the patent literature 1, it is described that the resulting transparent gel can be used as a bio-adhesive. In the patent literature 2, it is described that the resulting polymer is excellent in ink absorption properties, has high water resistance and can be used as a recording material for use in an inkjet recording system free from blocking. In the patent literature 3, it is described that the resulting polymer can be used as an adhesive that firmly bonds a metal hub for driving an optical information disc to a resin substrate. In the patent literature 4, it is described that the polymer obtained by not only crosslinking of an ethylenically unsaturated bond but also crosslinking of a sulfonic acid group or a phosphoric acid group through ionic reaction with an epoxy group can be used as an electrically conductive cured film having excellent mechanical performance, solvent resistance, film-forming properties, adhesion properties, transparency and abrasion resistance.

In the non patent literature 4, it is described that hydrophilicity of a slightly crosslinked film formed on a glass varies (in advancing contact angle and receding contact angle) with an alkylene chain length (C6 to 010) of sulfoalkylene methacrylate used as a monomer, and it also varies with hydration time.

The above polymers, however, have low degree of crosslinking between molecules and have high solubility in water, or absorb water and easily become gel-like though they are insoluble in water, or are liable to be damaged because their surfaces are soft, or have insufficient hydrophilicity, and therefore, they cannot be said to be satisfactory for use as antifogging materials, antifouling materials, etc.

In a patent literature 6, there has been proposed, as a technique to produce a hydrophilic molded product, a two-layer structure obtained by two-time coating comprising coating a surface of a substrate with a crosslinking polymerizable monomer composition, controlling ultraviolet irradiation dose to form a crosslinked polymer which has been incompletely polymerized, then coating a surface of the crosslinked polymer with a hydrophilic monomer and irradiating it with ultraviolet rays again to perform block or graft polymerization of the hydrophilic monomer onto the surface of the crosslinked polymer.

The above technique, however, is apparently complicated and costs high as compared with a general technique of a single-layer structure obtained by one-time coating comprising coating with a composition comprising a hydrophilic monomer and a crosslinking monomer and polymerizing the composition by means of ultraviolet rays or the like, and this technique is liable to impair smoothness of the surface, so that this technique cannot be said to be a preferred technique.

In the patent literature 8, there has been proposed a technique wherein a coating agent, which has been improved in solubility in organic monomers such as polyvalent (meth) acrylate and phosphoric acid-based (meth)acrylate by adding an ethanolamine-based compound to sulfonic acid-based (meth)acrylate having low solubility in organic solvents, is applied and subjected to UV irradiation to form a coating film having excellent antifogging properties and smoothness.

In this technique of the patent literature 8, a two-layer film consisting of a resin layer and a liquid layer is formed on the resulting substrate, but this two-layer film has tack. When this two-layer film is evaluated as such, it is transparent, has high antifogging properties and high smoothness and is hydrophilic. In this two-layer film, however, the upper layer (liquid layer) easily dissolves out by water washing or the like and vanishes. The film mainly composed of the residual resin layer has no tack, but the hydrophilicity is markedly lowered and the antifogging properties disappear.

Also the present inventors have previously proposed, as a technique to solve the above problems, a polymer using a hydroxyl group-containing (meth)acrylamide compound (patent literature 5).

In general, high surface hardness and high hydrophilicity can be mentioned as properties required for resins for antifouling coating. As properties required for resins for antifogging coating, relatively high surface hardness and hydrophilicity higher than that required for antifouling coating can be mentioned.

As a proposal to satisfy all of these requirements and to completely overcome the problems of "fogging" and "fouling", a proposal of a single-layer film in which anionic hydrophilic groups are inclined to (concentrated at) the surface has been made (patent literature 7). The hydrophilic film obtained by this invention is transparent, has extremely high hydrophilicity, is excellent in antifogging properties, antifouling properties, antistatic properties, quick drying properties (high drying rate of adhesive moisture) and chemical resistance, is hard and also has excellent scratch resistance.

This single-layer film, however, is lowered in transparency, is lowered in hydrophilicity and suffers cracking in some cases depending upon the production conditions.

Therefore, there is yet room for improvement in the above single-layer film.

CITATION LIST

Patent Literature

Patent literature 1: National Publication of International Patent No. 2002-521140
Patent literature 2: Japanese Patent Laid-Open Publication No. 1999-115305
Patent literature 3: Japanese Patent Laid-Open Publication No. 1996-325524
Patent literature 4: Japanese Patent Publication No. 1978-010636
Patent literature 5: WO2004/058900
Patent literature 6: Japanese Patent Laid-Open Publication No. 2001-98007
Patent literature 7: WO2007/064003
Patent literature 8: Japanese Patent Laid-Open Publication No. 1980-090516

Non Patent Literature

Non patent literature 1: Toagosei Annual Report of Research, "TREND" 1999, February, pp. 39-44
Non patent literature 2: Polymer, 44(5), p. 307
Non patent literature 3: Expected Materials for the Future, 2(1), pp. 36-41
Non patent literature 4: Journal of Colloid and Interface Science, vol. 110(2), 468-476 (1986)

SUMMARY OF INVENTION

Technical Problem

It is an object of the present invention to stably provide a hydrophilic cured product, such as a single-layer film, in which anionic hydrophilic groups are concentrated at (inclined to) a surface that is in contact with the air and which is excellent in transparency and adhesion to a substrate and tends to be rarely cracked.

Solution to Problem

The present inventors have repeatedly studied in order to solve the above problems, and as a result, they have found that when a specific compound having a sulfonic acid group is added to a polyvalent monomer having two or more (meth) acryloyl groups to prepare a mixture and then a cured product such as a single-layer film is produced from the mixture, inclination (concentration) of anionic hydrophilic groups to a surface of the single-layer film is stabilized, and a hydrophilic film of high quality is obtained under wider production conditions such as wider coating conditions. Moreover, they have found that when a specific compound having a sulfonic acid group is further added to a mixture containing a specific mono (meth)acrylate having an anionic hydrophilic group and a polyvalent monomer having two or more (meth)acryloyl groups and then a cured product such as a single-layer film is produced from the resulting mixture, inclination (concentration) of anionic hydrophilic groups to a surface of the hydrophilic cured product such as a single-layer film, said surface being in contact with the air, is stabilized, and a hydrophilic film of high quality is obtained under wider production conditions such as wider coating conditions. The present inventors have further found that the inclined hydrophilic cured product (e.g., inclined single-layer film) obtained by the addition of a specific compound having a sulfonic acid group is remarkably improved also in abrasion resistance, and they have accomplished the present invention.

That is to say, the hydrophilic cured product of the present invention is characterized by being obtained by polymerizing a mixture containing a polyvalent monomer (II) having two or more (meth)acryloyl groups and a compound (IV) having at least one group selected from a mercapto group, a hydroxyl group and an amino group and having a sulfonic acid group (except a mono (meth)acrylate having at least one anionic hydrophilic group selected from a sulfonic acid group, a carboxyl group and a phosphoric acid group, and the polyvalent monomer (II)).

The compound (IV) contained in the mixture is preferably at least one compound selected from a group of compounds represented by the following general formulas (100), (200) and (300):

[Chem. 1]

$$D_1 {\left(\begin{array}{c} R_1 \\ | \\ | \\ R_2 \end{array}\right)}_{nn} \underset{\underset{O}{\|}}{\overset{\overset{O}{\|}}{S}} - O - Z \quad (100)$$

wherein $D_1$ is a mercapto group, an amino group, a methylamino group or an ethylamino group, Z is a hydrogen ion, an ammonium ion, an amine ion, an alkaline metal ion or an alkaline earth metal ion of ½ atom, $R_1$ and $R_2$ are each independently H, a methyl group, an ethyl group, a methoxy group or an ethoxy group, and nn is an integer of 1 to 10,

[Chem. 2]

$$(D_2)_l \underset{}{-} {\left[\begin{array}{c} \phantom{xx} \end{array}\right]}_n \underset{}{-} {\left(\begin{array}{c} (R_3)_k \\ \underset{\underset{O}{\|}}{\overset{\overset{O}{\|}}{S}} - O - Z \end{array}\right)}_m \quad (200)$$

wherein $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or an alkaline earth metal ion of ½ atom, each $R_3$ is independently H, a methyl group, an ethyl group, a methoxy group, an ethoxy group, a fluorine atom, a chlorine atom, a bromine atom or an iodine atom, k is an integer of 0 to 10, l and m are each independently an integer of 1 to 11, k, l and m are numbers satisfying the condition of k+l+m=2 to 6+2n, and n is an integer of 0 to 3,

[Chem. 3]

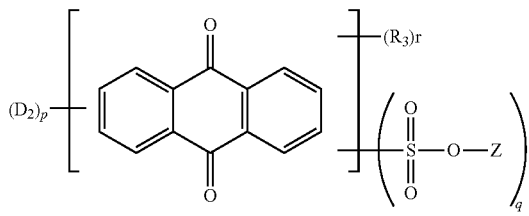

(300)

wherein $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or an alkaline earth metal ion of ½ atom, each $R_3$ is independently H, a methyl group, an ethyl group, a methoxy group, an ethoxy group, a fluorine atom, a chlorine atom, a bromine atom or an iodine atom, r is an integer of 0 to 6, q and p are each independently an integer of 1 to 7, and p, q and r are numbers satisfying the condition of p+q+r=an integer of 2 to 8.

The amount of the compound (IV) added based on 100 parts by weight of the polyvalent monomer (II) is preferably in the range of 0.01 to 200 parts by weight.

In the mixture, a mono(meth)acrylate (I) having at least one anionic hydrophilic group selected from a sulfonic acid group, a carboxyl group and a phosphoric acid group is preferably further contained.

When the mono(meth)acrylate (I) is contained in the mixture, the amount of the compound (IV) added based on 100 parts by weight of the total amount of the mono(meth)acrylate (I) and the polyvalent monomer (II) is preferably in the range of 0.01 to 200 parts by weight, more preferably in the range of 0.01 to 30 parts by weight.

The single-layer film of the present invention is formed from the above hydrophilic cured product.

In the single-layer film, the degree of inclination (anion concentration ratio) (Sa/Da) of a surface concentration (Sa) of sulfonic acid groups, carboxyl groups and phosphoric acid groups that are anionic hydrophilic groups to a deep part concentration (Da) of these anionic hydrophilic groups at the position of ½ of the film thickness of the single layer film is preferably not less than 1.1.

The water contact angle of the single-layer film is preferably not more than 30°, more preferably not more than 10°.

The film thickness of the single-layer film is usually 0.05 to 500 μm.

The process for producing a laminate including a single-layer film having an anionic hydrophilic group and formed on at least one surface of a substrate according to the present invention comprises:

a step of preparing a mixture which contains a monomer composition containing a polyvalent monomer (II) having two or more (meth)acryloyl groups and a compound (IV) having at least one group selected from a mercapto group, a hydroxyl group and an amino group and having a sulfonic acid group (except a mono (meth)acrylate having at least one anionic hydrophilic group selected from a sulfonic acid group, a carboxyl group and a phosphoric acid group, and the polyvalent monomer (II)) and contains a solvent containing a compound having a solubility parameter σ of not less than 9.3 (cal/cm$^3$), a step of applying the mixture to at least one surface of a substrate, a step of removing at least a part of the solvent from the mixture applied, and a step of polymerizing the mixture having passed through the above steps.

Advantageous Effects of Invention

The hydrophilic cured product of the present invention, such as a single-layer film, has high hydrophilicity and high surface hardness, exhibits excellent antifogging properties, antifouling properties, antistatic properties and scratch resistance, is excellent in transparency and adhesion to a substrate, tends to be rarely cracked and tends to have excellent abrasion resistance. According to the present invention, further, hydrophilic single-layer films and hydrophilic materials including them, for example, an antifogging material, an antifouling material, an antistatic material, an antifogging film, an antifouling film, an antistatic film and laminates having these films laminated on substrates, can be more easily provided than the conventional materials and films.

BRIEF DESCRIPTION OF DRAWINGS

FIG. 1 is a group of schematic views showing a process for preparing a sample for measuring an anion concentration ratio.

DESCRIPTION OF EMBODIMENTS

The hydrophilic cured product of the present invention, such as a single-layer film, is formed from a resin composition, and this resin composition contains a resin obtained by polymerizing a mixture containing a polyvalent monomer (II) and a compound (IV) having at least one group selected from a mercapto group, a hydroxyl group and an amino group and having a sulfonic acid group (except a mono (meth)acrylate (I) having at least one anionic hydrophilic group selected from a sulfonic acid group, a carboxyl group and a phosphoric acid group, and the polyvalent monomer (II)).

The polyvalent monomer (II) for use in the present invention is characterized by containing two or more (meth)acryloyl groups that are polymerizable functional groups.

Examples of the methacryloyl groups include (meth)acryloyloxy group, (meth)acryloylthio group and (meth)acrylamide group. Of these (meth)acryloyl groups, (meth)acryloyloxy group and (meth)acryloylthio group are preferable.

Of such polyvalent monomers (II), preferable are a polyvalent monomer having one or more hydroxyl groups and two or more (meth)acryloyl groups, a polyvalent monomer having one or more linkages selected from ether linkages and thioether linkages and two or more (meth)acryloyl groups, a polyvalent monomer having one or more ester linkages (except ester linkage of a part directly bonded to (meth)acryloyl group) and two or more (meth)acryloyl groups, a polyvalent monomer having one or more groups selected from alicyclic groups and aromatic groups and two or more (meth)acryloyl groups, and a polyvalent monomer having one or more hetero rings and two or more (meth)acryloyl groups.

Examples of the polyfunctional monomers (II) include:

ethylene glycol di(meth)acrylate, 1,2-propanediol di(meth)acrylate, 1,3-propanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, 2-methyl-1,8-octanediol di(meth)acrylate, 2-butyl-2-ethyl-1,3-propanediol di(meth)acrylate, 1,2-bis{3-(meth)acryloyloxy-2-hydroxy-propyloxy}ethane, 1,2-bis{3-(meth)acryloyloxy-2-hydroxy-propyloxy}propane, 1,3-bis{3-(meth)acryloyloxy-2-hydroxy-propyloxy}propane, 1,4-bis{3-(meth)acryloyloxy-2-hydroxy-propyloxy}butane, 1,6-bis{3-(meth)acryloyloxy-2-hydroxy-propyloxy}hexane;

neopentyl glycol hydroxypivalate di(meth)acrylate;

polyethylene glycol di(meth)acrylate, 1,2-polypropylene glycol di(meth)acrylate, 1,3-polypropylene glycol di(meth)acrylate, 1,4-polybutylene glycol di(meth)acrylate, polyethylene glycol-bis{3-(meth)acryloyloxy-2-hydroxy-propyl}ether, 1,2-polypropylene glycol-bis{3-(meth)acryloyloxy-2-hydroxy-propyl}ether;

1,2-polypropylene glycol-bis{(meth)acryloyl-poly(oxyethylene)}ether;

1,3-polypropylene glycol di(meth)acrylate, 1,4-polybutylene glycol di(meth)acrylate, and 1,4-polybutylene glycol-bis{3-(meth)acryloyloxy-2-hydroxy-propyl}ether.

Examples of the polyfunctional monomers (II) further include:

bis{2-(meth)acryloylthioethyl}sulfide, bis{5-(meth)acryloylthio-3-thiapentyl}sulfide;

cyclohexanediol di(meth)acrylate, bis{(meth)acryloyloxy-methyl}cyclohexane, bis{7-(meth)acryloyloxy-2,5-dioxaheptyl}cyclohexane, bis{(meth)acryloyloxy-poly(ethyleneoxy)-methyl}cyclohexane;

tricyclodecane dimethanol di(meth)acrylate;

2-propenoic acid {2-(1,1-dimethyl-2-{(1-oxo-2-propenyl)oxy}ethyl)-5-ethyl-1,3-dioxan-5-yl}methyl ester (manufactured by Nippon Kayaku Co., Ltd., trade name "KAYARAD R-604");

N,N',N"-tris{2-(meth)acryloyloxyethyl}isocyanurate;

xylylenediol di(meth)acrylate, bis{7-(meth)acryloyloxy-2,5-dioxaheptyl}benzene, bis{(meth)acryloyloxy-poly(ethyleneoxy)-methyl}benzene:

bisphenol A di(meth)acrylate, bis{(meth)acryloyloxyethyl}bisphenol A, bis{(meth)acryloyloxypropyl}bisphenol A, bis{(meth)acryloyl-poly(oxyethylene)}bisphenol A, bis{(meth)acryloyl-poly(oxy-1,2-propylene)}bisphenol A, bis{3-(meth)acryloyloxy-2-hydroxypropyl}bisphenol A, bis{3-(meth)acryloyloxy-2-hydroxypropyl-oxyethyl}bisphenol A, bis{3-(meth)acryloyloxy-2-hydroxypropyl-oxypropyl}bisphenol A, bis{3-(meth)acryloyloxy-2-hydroxypropyl-poly(oxyethylene)}bisphenol A, bis{3-(meth)acryloyloxy-2-hydroxypropyl-poly(oxy-1,2-propylene)}bisphenol A;

bis{(meth)acryloyloxyethyl-oxypropyl}bisphenol A, bis{(meth)acryloylpoly(oxyethylene)-poly(oxy-1,2-propylene)}bisphenol A;

naphthalenediol di(meth)acrylate, bis{3-(meth)acryloyloxy-2-hydroxypropyl-oxy}naphthalene;

9,9-fluorenediol di(meth)acrylate, 9,9-bis{4-(2-(meth)acryloyloxyethyl-oxy)}fluorene, and 9,9-bis{3-phenyl-4-(meth)acryloyloxy-poly(ethyleneoxy)}fluorene.

Examples of the polyfunctional monomers (II) furthermore include:

phenolic novolak type epoxy(meth)acrylate (manufactured by Shin-Nakamura Chemical Co., Ltd., trade name "NKOligo EA-8320, EA-7120, EA-7420");

glycerol-1,3-di(meth)acrylate, 1-acryloyloxy-2-hydroxy-3-methacryloyloxy-propane, 2,6,10-trihydroxy-4,8-dioxaundecane-1,11-di(meth)acrylate, 1,2,3-tris{3-(meth)acryloyloxy-2-hydroxypropyl-oxy}propane, 1,2,3-tris{2-(meth)acryloyloxyethyl-oxy}propane, 1,2,3-tris{2-(meth)acryloyloxypropyl-oxy}propane, 1,2,3-tris{(meth)acryloyloxy-poly(ethyleneoxy)}propane, 1,2,3-tris{(meth)acryloyloxy-poly(1,2-propyleneoxy)}propane;

trimethylolpropane tri(meth)acrylate, trimethylolpropane-tris{(meth)acryloyloxyethyl-oxy}ether, trimethylolpropane-tris{2-(meth)acryloyloxypropyl-oxy)ether, trimethylolpropane-tris{(meth)acryloyloxy-poly(ethyleneoxy)}ether, trimethylolpropane-tris{(meth)acryloyloxy-poly(1,2-propyleneoxy)}ether, pentaerythritol tri(meth)acrylate, pentaerythritol tetra(meth)acrylate, pentaerythritol-tetrakis{(meth)acryloyloxyethyl-oxy}ether, pentaerythritol-tetrakis{2-(meth)acryloyloxypropyl-oxy}ether, pentaerythritol-tetrakis{(meth)acryloyloxy-poly(ethyleneoxy)}ether, pentaerythritol-tetrakis{(meth)acryloyloxy-poly(1,2-propyleneoxy}ether;

ditrimethylolprpane tetra(meth)acrylate, ditrimethylolpropane-tetrakis{(meth)acryloyloxyethyl-oxy}ether, ditrimethylolpropane-tetrakis{2-(meth)acryloyloxypropyl-oxy}ether, ditrimethylolpropane-tetrakis{(meth)acryloyloxy-poly(ethyleneoxy)}ether, ditrimethylolpropane-tetrakis{(meth)acryloyloxy-poly(1,2-propyleneoxy)}ether, dipentaerythritol penta(meth)acrylate, dipentaerythritol hexa(meth)acrylate, dipentaerythritol-hexa{(meth)acryloyloxyethyl-oxy}ether, dipentaerythritol-hexa{2-(meth)acryloyloxypropyl-oxy}ether, dipentaerhtyritol-hexa{(meth)acryloyloxy-poly(ethyleneoxy)}ether, and dipentaerythritol-hexa{(meth)acryloyloxy-poly(1,2-propyleneoxy)}ether.

As the polyfunctional monomers (II), there can be additionally mentioned, for example, a urethane reaction product of 2-hydroxyethyl (meth)acrylate, 2-hydroxypropyl (meth)acrylate, 3-hydroxypropyl (meth)acrylate or 4-hydroxybutyl (meth)acrylate with hexamethylene diisocyanate;

a urethane reaction product of 2-hydroxyethyl (meth)acrylate, 2-hydroxypropyl (meth)acrylate, 3-hydroxypropyl (meth)acrylate or 4-hydroxybutyl (meth)acrylate with isophorone diisocyanate;

a urethane reaction product of 2-hydroxyethyl (meth)acrylate, 2-hydroxypropyl (meth)acrylate, 3-hydroxypropyl (meth)acrylate or 4-hydroxybutyl (meth)acrylate with bis (isocyanatomethyl)norbornane;

a urethane reaction product of 2-hydroxyethyl (meth)acrylate, 2-hydroxypropyl (meth)acrylate, 3-hydroxypropyl (meth)acrylate or 4-hydroxybutyl (meth)acrylate with bis(4-isocyanatocyclohexyl)methane;

a urethane reaction product of 2-hydroxyethyl (meth)acrylate, 2-hydroxypropyl (meth)acrylate, 3-hydroxypropyl (meth)acrylate or 4-hydroxybutyl (meth)acrylate with 1,3-bis (isocyanatomethyl)cyclohexane; and a urethane reaction product of 2-hydroxyethyl (meth)acrylate, 2-hydroxypropyl (meth)acrylate, 3-hydroxypropyl (meth)acrylate or 4-hydroxybutyl (meth)acrylate with m-xylylene diisocyanate.

Although these polyfunctional monomers (II) can be produced by publicly known processes or processes equivalent to the publicly known processes, they are also obtainable as commercial products.

The compound (IV) for use in the present invention is a compound other than the polyvalent monomer (II) and the later-described mono (meth) acrylate (I), and is characterized by having at least one group selected from a mercapto group, a hydroxyl group and an amino group and having a sulfonic acid group. Because at least one group selected from a mercapto group, a hydroxyl group and an amino group is contained in the compound (IV), Michael addition reaction of the compound (IV) with the polyvalent monomer (II) or the like becomes possible. A reaction product itself formed by the reaction of the compound (IV) with the polyvalent monomer (II) or the like inclines in the direction of a cured product surface that is in contact with the air. In the case of, for example, a single-layer film formed on a substrate, the reaction product inclines in the direction of a film surface that is in contact with the air from the vicinity of the substrate (vicinity of the bottom), whereby a single-layer film in which sulfonic acid groups incline in the film thickness direction can be formed.

Moreover, because the compound (IV) has the above group, it becomes possible to control the degree of inclination of the concentration of anionic hydrophilic groups derived from a mono(meth)acrylate (I) in the case where a component derived from the mono(meth)acrylate (I) is contained in the hydrophilic cured product of the present invention such as a single-layer film.

The sulfonic acid group may be contained in the compound (IV) as it is, but it may be contained in the form of a quaternary ammonium salt; an alkaline metal salt, such as lithium salt, sodium salt, potassium salt or rubidium salt; an alkaline earth metal salt such as magnesium salt or calcium salt; or a salt of another metal.

Of such forms, a form of an alkaline metal salt is preferable, and a form of a sodium salt or a potassium salt is more preferable.

When a hydroxyl group is contained in the compound (IV), a phenolic hydroxyl group is preferable as compared with an alcoholic hydroxyl group.

From the viewpoint that the reaction product formed by the reaction of the compound (IV) with the polyvalent monomer (II) inclines in a more favorable state as a hydrophilic material or from the viewpoint that the degree of inclination of the concentration of anionic hydrophilic groups derived from a mono(meth)acrylate (I) in the hydrophilic cured product such as a single-layer film is controlled to be in a more preferred range in the case where a component derived from the mono (meth)acrylate (I) is contained in the hydrophilic cured product such as a single-layer film, compounds represented by the general formula (100), the general formula (200) and the general formula (300) described below are preferable among the compounds (IV).

[Chem. 1]

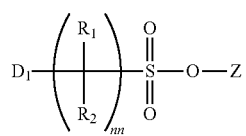
(100)

In the formula (100), $D_1$ is a mercapto group, an amino group, a methylamino group or an ethylamino group. Of these groups as $D_1$, a mercapto group and an amino group tend to be preferable. Z is a hydrogen ion, an ammonium ion, an amine ion, an alkaline metal ion or an alkaline earth metal ion of ½ atom. Of these ions as Z, a hydrogen ion and an alkaline metal ion tend to be preferable. $R_1$ and $R_2$ are each independently H, a methyl group, an ethyl group, a methoxy group or an ethoxy group. nn is an integer of 1 to 10.

Examples of the compounds represented by the general formula (100) include:

sodium mercaptomethylsulfonate, mercaptoethylsulfonic acid, lithium 2-mercaptoethylsulfonate, sodium 2-mercaptoethylsulfonate, potassium 2-mercaptoethylsulfonate, rubidium 2-mercaptoethylsulfonate, magnesium 2-mercaptoethylsulfonate, calcium 2-mercaptoethylsulfonate, sodium 2-mercaptopropylsulfonate, sodium 3-mercaptopropylsulfonate, potassium 3-mercaptopropylsulfonate, sodium2-mercaptobutylsulfonate, sodium 3-mercaptobutylsulfonate, sodium 4-mercaptobutylsulfonate, sodium 2-mercaptobutyl-3-sulfonate, sodium 6-mercaptohexylsulfonate, sodium 8-mercaptooctylsulfonate, sodium 10-mercaptodecylsulfonate;

aminomethylsulfonic acid, 2-aminoethylsulfonic acid (taurine), N-methyl-2-aminoethylsulfonic acid (N-methyltaurine), N-ethyl-2-aminoethylsulfonic acid (N-ethyltaurine), 3-aminopropylsulfonic acid, 4-aminobutylsulfonic acid, 6-aminohexylsulfonic acid, 8-aminoethylsulfonic acid, 10-aminodecylsulfonic acid, sodium 2-aminomethylsulfonate, sodium 2-aminoethylsulfonate, sodium N-methyl-2-aminoethylsulfonate, sodium 3-aminopropylsulfonate, and potassium 3-aminopropylsulfonate.

Of these compounds, preferable are mercaptoethylsulfonic acid, sodium 2-mercaptoethylsulfonate, potassium 2-mercaptoethylsulfonate, sodium 3-mercaptopropylsulfonate, potassium 3-mercaptopropylsulfonate, aminomethylsulfonic acid and 2-aminoethylsulfonic acid (taurine). Also preferable are sodium 2-aminomethylsulfonate, sodium 2-aminoethylsulfonate, sodium N-methyl-2-aminoethylsulfonate and sodium 3-aminopropylsulfonate.

[Chem. 2]

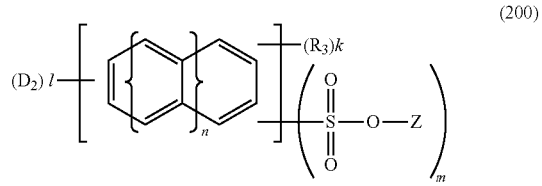
(200)

In the formula (200), $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or an alkaline earth metal ion of ½ atom, and each $R_3$ is independently H, a methyl group, an ethyl group, a methoxy group, an ethoxy group, a fluorine atom, a chlorine atom, a bromine atom or an iodine atom. k is an integer of 0 to 10, and l and m are each independently an integer of 1 to 11. However, k, l and m are numbers satisfying the condition of k+l+m=2 to 6+2n. n is an integer of 0 to 3, Examples of the compounds represented by the general formula (200) include 3-aminobenzenesulfonic acid, 4-aminobenzenesufonic acid sodium salt, 5-aminotoluene-2-sulfonic acid, 4-amino-3-methoxybenzenesulfonic acid sodium salt, 3-amino-4-methoxybenzenesulfonic acid potassium salt, 7-amino-1,3-naphthalenedisulfonic acid monopotassium salt, 8-amino-1,3-naphthalenedisulfonic acid monosodium salt, 7-amino-1,3,6-napthalenetrisulfonic acid disodium salt, 8-amino-1,3,6-naphthalenetrisulfonic acid trisodium salt, 4-hydroxybenzenesulfonic acid sodium salt, 4-hydroxy-3-methoxybenzenesulfonic acid potassium salt, 1,2-dihydroxy-3,5-benzenedisulfonic acid disodium salt, 2-hydroxy-6,8-naphthalenesulfonic acid dipotassium salt, and 8-hydroxypyrene-1,3,6-trisulfonic acid trisodium salt.

Of these compounds, preferable are 4-aminobenzenesulfonic acid potassium salt, 5-aminotoluene-2-sulfonic acid sodium salt, 7-amino-1,3-naphthalenedisulfonic acid monopotassium salt, 8-amino-1,3,6-naphthalenetrisulfonic acid trisodium salt and 4-hydroxybenzenesulfonic acid sodium salt.

[Chem. 3]

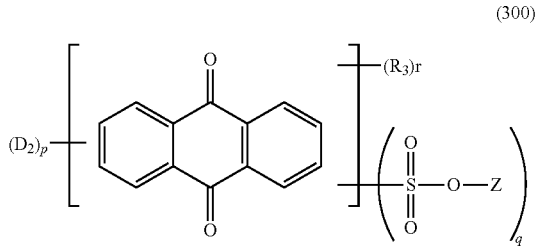

In the formula (300), $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or an alkaline earth metal ion of ½ atom, and each $R_3$ is independently H, a methyl group, an ethyl group, a methoxy group, an ethoxy group, a fluorine atom, a chlorine atom, a bromine atom or an iodine atom. r is an integer of 0 to 6, and q and p are each independently an integer of 1 to 7. However, p, q and r are numbers satisfying the condition of p+q+r=an integer of 2 to 8.

Examples of the compounds represented by the general formula (300) include sodium 1-aminoanthraquinone-2-sulfonate, sodium 1-aminoanthraquinone-4-sulfonate, sodium 1-aminoanthraquinone-8-sulfonate, sodium 1-amino-4-bromoanthraquinone-2-sulfonate, and sodium 1-amino-2,4-dihydroxyanthraquinone-3-sulfonate.

Of these compounds, preferable are sodium 1-amino-4-bromoanthraquinone-2-sulfonate and sodium 1-amino-2,4-dihydroxyanthraquinone-3-sulfonate.

The compound (IV) is added in order to incline (concentrate) a reaction product having a sulfonic acid group, which is formed by Michael addition reaction of the compound (IV) with the polyvalent monomer (II), to a surface of the hydrophilic cured product such as a single-layer film, said surface being in contact with the air. When a component derived from the later-described mono (meth) acrylate (I) is contained in the hydrophilic cured product such as a single-layer film, the compound (IV) is added in order to control the inclination (the concentration) of sulfonic acid groups, carboxyl groups and phosphoric acid groups that are anionic hydrophilic groups derived from the mono(meth)acrylate (I) to the surface of the single-layer film of the present invention.

The hydrophilic cured product of the present invention such as a singly-layer film is formed from a resin composition, and one preferred embodiment of this resin composition is a composition containing a resin obtained by polymerizing a mixture which contains, in addition to the polyvalent monomer (II) and the compound (IV), a mono (meth) acrylate (I) having at least one anionic hydrophilic group selected from a sulfonic acid group, a carboxyl group and a phosphoric acid group.

The mono (meth) acrylate (I) is characterized by having at least one anionic hydrophilic group selected from a sulfonic acid group, a carboxyl group and a phosphoric acid group.

The anionic hydrophilic group may be contained as it is, but it may be contained in the form of a quaternary ammonium salt; an alkaline metal salt, such as lithium salt, sodium salt, potassium salt or rubidium salt; an alkaline earth metal salt such as magnesium salt or calcium salt; or a salt of another metal.

Of these forms, a form of an alkaline metal salt is preferable, and a form of a sodium salt, a potassium salt or a rubidium salt is more preferable.

The mono(meth)acrylate (I) is preferably a monomethacrylate represented by the following general formula (1).

$$[X]_s[M1]_l[M2]_m \quad (1)$$

In the general formula (1), s is 1 or 2, l is 1 or 2, m is 0 or 1. The mono (meth) acrylate represented by the general formula (1) is electrically neutral.

In the formula (1), M1 and M2 are each a monovalent cation selected from a hydrogen ion, an ammonium ion, an amine ion and an alkaline metal ion, or an alkaline earth metal ion that is a divalent cation, and they may be the same or different.

X is a hydrophilic anion represented by any one of the following general formulas (1-1) to (1-4) and containing a (meth)acryloyl group.

Here, the amine ion is a monovalent cation derived from primary amine, secondary amine or tertiary amine.

The formula weight of X is usually in the range of 50 to 18,000, preferable 100 to 1,000, more preferably 170 to 500.

As X, X in a state of an oligomer (number of repeating units: usually 2 to 20), which is obtained by allowing carbon-carbon double bonds contained in groups represented by the following general formulas (1-1) to (1-4) to react with each other and contains a structure derived from X as a repeating unit, may be used. The molecular weight of this oligomer is usually in the range of 100 to 30,000, preferably 200 to 10,000, more preferably 300 to 5,000.

[Chem. 7]

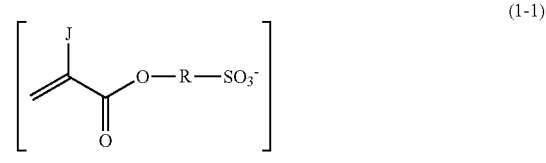

(1-1)

[Chem. 8]

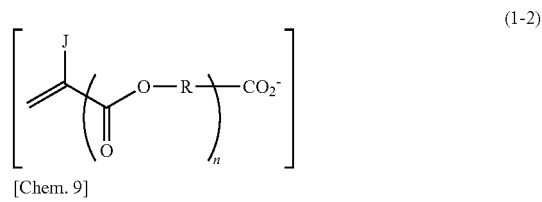

(1-2)

[Chem. 9]

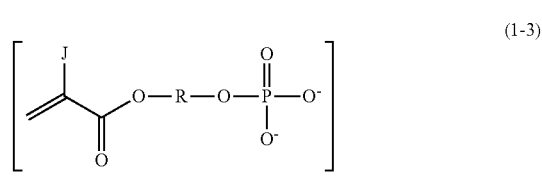

(1-3)

[Chem. 10]

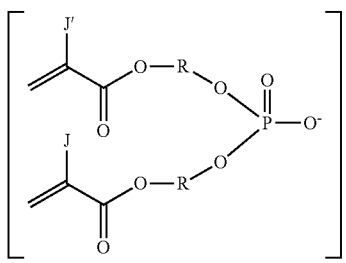

(1-4)

In the above general formulas (1-1) to (1-4), J and J' are each H or $CH_3$ and may be the same or different, and n is 0 or 1. R and R' are each a hydrocarbon group of 1 to 600 carbon atoms which may contain an aromatic group, an alicyclic hydrocarbon group, an ether group or an ester group, and they may be the same or different. The number of carbon atoms of the above R and R' is preferably 2 to 100, more preferably 2 to 20.

As the mono(meth)acrylates represented by the general formula (1), mono(meth)acrylates represented by the following general formulas (1-1-1) and (1-1-2) are preferable.

[Chem. 11]

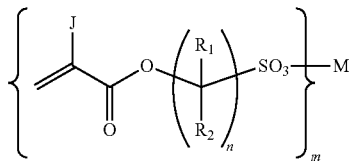

(1-1-1)

[Chem. 12]

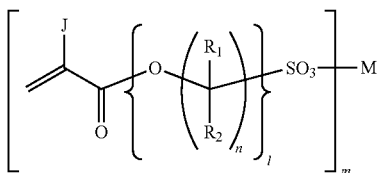

(1-1-2)

In the above formulas (1-1-1) and (1-1-2), J is H or $CH_3$.

$R_1$ and $R_2$ are each independently H, $CH_3$ or an ethyl group. From the viewpoint of ease of synthesis, $R_1$ and $R_2$ are each preferably H.

n is an integer of 2 to 20. From the viewpoint of ease of synthesis, n is preferably an integer of 2 to 10, more preferably an integer of 2 to 4.

m is an integer of 1 to 2. When the later-described M is a monovalent group, m is 1, and when M is a divalent group, m is 2.

l is an integer of 2 to 10. l is preferably 2 to 6, more preferably 2 to 4

M is a monovalent cation selected from a hydrogen ion, an ammonium ion, an amine ion and an alkaline metal ion, or an alkaline earth metal ion that is a divalent cation.

Of such ammonium ions and amine ions, preferable are ammonium ion, methylamine ion, dimethylamine ion and triethylamine ion.

Examples of the alkaline metal ions include lithium ion, sodium ion, potassium ion and rubidium ion. Examples of the alkaline earth metal ions include beryllium ion, magnesium ion, calcium ion and strontium ion.

Of these ions as M, monovalent alkaline metal ions are preferable, and sodium ion, potassium ion and rubidium ion are more preferable.

Of the mono(meth)acrylates represented by the general formulas (1-1-1) and (1-1-2), 2-sulfonylethyl (meth)acrylate and alkaline metal salts thereof, and 3-sulfonylpropyl (meth) acrylate and alkaline metal salts thereof are preferable.

The molecular weight of these mono(meth)acrylates (I) is usually in the range of 168 to 18,000, preferably 180 to 1,000, more preferably 200 to 500.

The above mono(meth)acrylates (I) may be used singly or in combination of two or more kinds.

Such a mono(meth)acrylate (I) may be used as a mono (meth)acrylate in a state of an oligomer formed by the reaction of the mono(meth)acrylates (I) with each other, or may be used as a mixture of a mono(meth)acrylate and the oligomer.

The mono(meth)acrylate (I) can be prepared by a publicly known process or a process equivalent to a publicly known process. For example, the mono(meth)acrylate can be prepared by processes described in Japanese Patent Publication No. 1974-36214, Japanese Patent Publication No. 1976-9732, Japanese Patent Laid-Open Publication No. 1988-284157 and U.S. Pat. No. 3,024,221. More specifically, the mono(meth)acrylate represented by the general formula (1-1-1) can be prepared by, for example, a process comprising allowing (meth)acrylic acid and propanesultone to react with each other in the presence of an alkaline metal salt of carbonic acid. The mono(meth)acrylate represented by the general formula (1-1-2) can be prepared by, for example, a process comprising halogenating a part of hydroxyl groups of a polyol compound with hydrogen halide, then allowing the halogen having been substituted to react with alkaline metal sulfonate to synthesize an alkaline metal sulfonate compound having a hydroxyl group and finally allowing the hydroxyl group to react with (meth)acrylic acid halide or (meth)acrylic acid.

It is thought that when the compound (IV) is added to a mixture containing the polyvalent monomer (II), a reaction of the compound (IV) with groups contained in the mixture, typically Michael addition reaction, occurs.

It is thought that when the compound (IV) is added to a mixture containing the polyvalent monomer (II) and the mono(meth)acrylate (I), a reaction of the compound (IV) with groups contained in the mixture, typically Michael addition reaction, occurs. When the polyvalent monomer (II) is contained in the largest amount in the mixture containing the polyvalent monomer (II) and the mono(meth)acrylate (I), the compound (IV) reacts with the polyvalent monomer (II) with the highest probability, and this reaction becomes a main reaction.

The main reaction thought to be occurring in the mixture of the polyvalent monomer (II), the compound (IV) and the mono(meth)acrylate (I) in the above case is described below illustrating typical reactions using typical compounds.

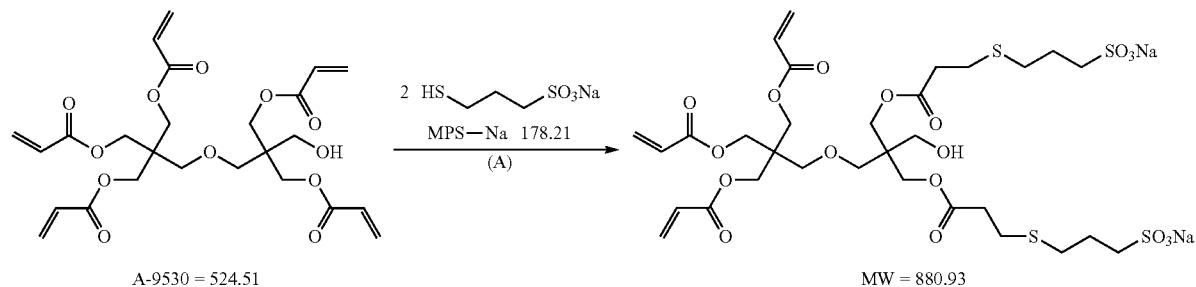
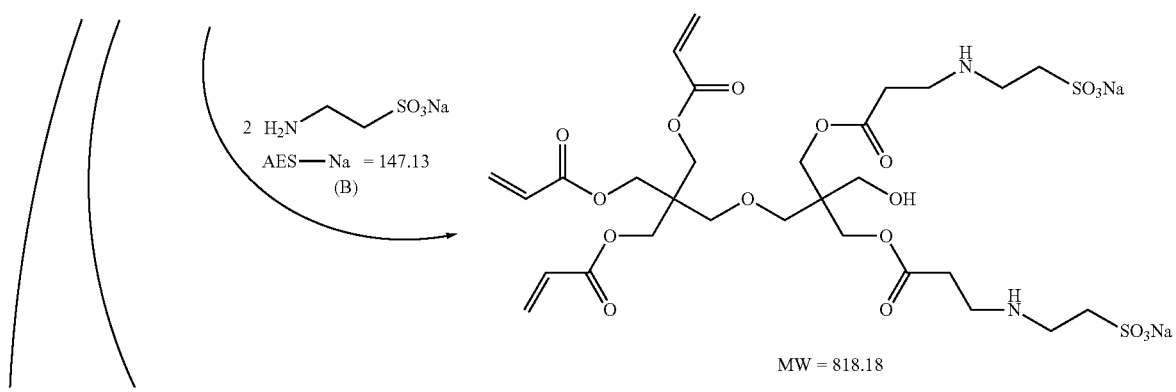
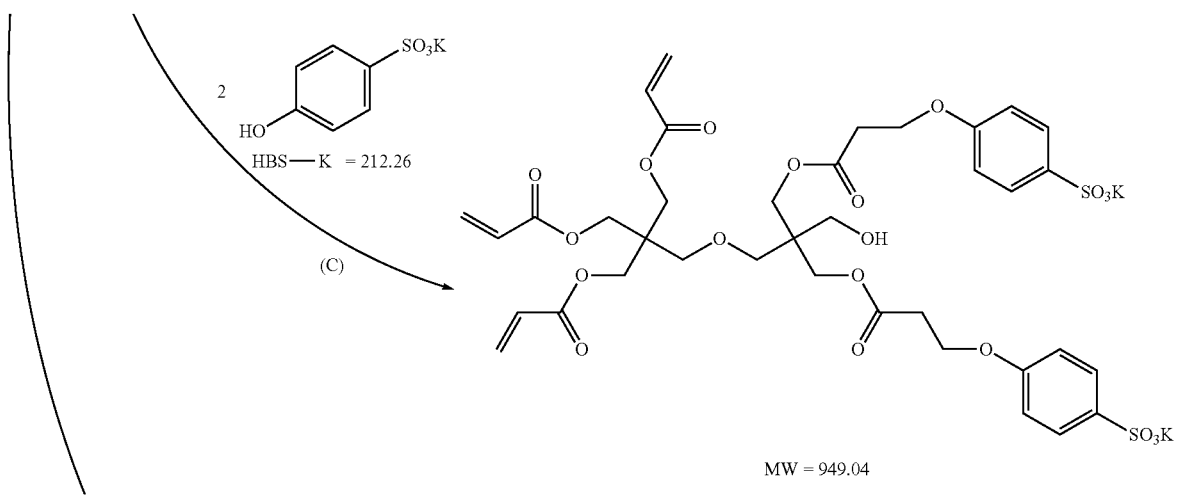

-continued

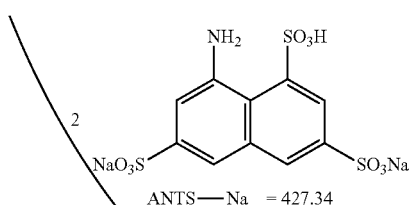

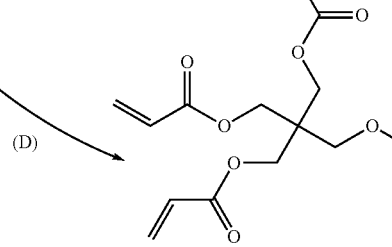

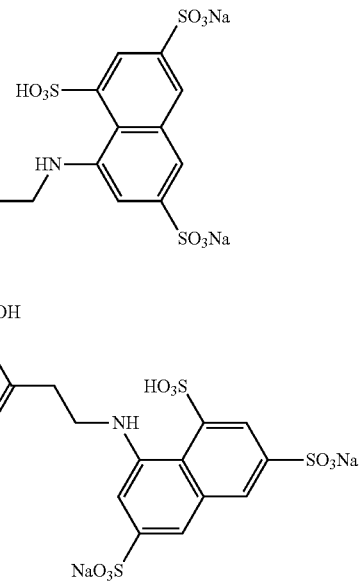

MW = 1379.19

First, the compound (IV) is added to a mixture of the polyvalent monomer (II) and the mono(meth)acrylate (I). The compound (IV) is solid in most cases, and therefore, even if it is added to the mixture as it is, the reaction hardly proceeds. Hence, the compound (IV) is dissolved in a solvent and then added. As the solvents, polar solvents, such as water, alcohols, dimethyl sulfoxide, sulfolane, dimethylformamide, N-methylpyrrolidone, N,N-dimethylimidazolidinone, and mixed solvents of these solvents, are used.

(A) When a compound having a mercapto group and a sulfonic acid group that is an anionic hydrophilic group reacts with the polyvalent monomer (II), the reaction usually proceeds by mixing them at room temperature. If the reaction rate is desired to be enhanced, basic catalysts, such as tertiary amines and phopsphines, are added. The amount of the basic catalyst added is usually in the range of 0.02 to 50% by weight, preferably 0.1 to 10% by weight, based on the total weight of the compound having a mercapto group and a sulfonic acid group, as the compound (IV), and the polyvalent monomer (II). If the reaction rate is desired to be enhanced by another method, heating to not lower than room temperature (e.g., temperature in the range of 30 to 100° C.) may be carried out instead of the addition of the catalyst or in addition to the addition of the catalyst. If the reaction rate is desired to be further enhanced, heating to not lower than 100° C. may be carried out, but the (meth)acryloyl group contained in the polyvalent monomer (II) sometimes undergoes polymerization.

(B) The reaction between a compound having an amino group that is one anionic hydrophilic group and a sulfonic acid group with the polyvalent monomer (II) proceeds by mixing them at room temperature. Especially when the sulfonic acid group has become a salt (e.g., when the compound is aminoethylsulfonic acid sodium salt), the amino group that is a reaction site rarely has interaction with the sulfonic acid group and is in a free state, so that even if no basic catalyst is added, the reaction of the compound with the polyvalent monomer (II) easily proceeds only by mixing them at room temperature. This reaction of (B) tends to proceed more rapidly than the reaction of (A). When the reaction is too rapid, it is enough just to carry out the reaction while dropwise adding the compound having an amino group and a sulfonic acid group by portions or while removing heat by the use of a cold water bath or the like. When the sulfonic acid group contained in the compound having an amino group and a sulfonic acid group has not become a salt (e.g., when the compound is aminoethylsulfonic acid), the amino group and the sulfonic acid group undergo intramolecular or intermolecular interaction to form a salt, and the reaction of the amino group that is a reaction site is inhibited, so that the reaction tends to become slow. In order to enhance the reaction rate, it is enough just to neutralize the sulfonic acid group with a base, such as sodium methoxide, sodium hydroxide or potassium hydroxide.

If the reaction rate is desired to be enhanced, heating to not lower than room temperature (e.g., temperature in the range of 30 to 100° C.) may be carried out similarly to (A). Although heating to not lower than 100° C. may be carried out, the (meth)acryloyl group contained in the polyvalent monomer (II) sometimes undergoes polymerization.

(C) The reaction using a compound having a phenolic hydroxyl group (typically, hydroxyl group directly bonded to a benzene ring) and a sulfonic acid group as the compound (IV) is almost the same as the reaction of (A). However, this reaction is considerably slow, so that in order to enhance the reaction rate, for example, it is enough just to heat the system to not lower than 100° C., preferably not lower than 200° C., or it is enough just to irradiate the system with energy rays such as ultraviolet rays.

(D) In the case of a sulfonic acid compound having an amino group directly bonded to a benzene ring, the reaction is almost the same as the reaction of (B). However, the reactivity tends to be a little lower as compared with that of (B). Heating may be carried out in the range of 30 to 100° C., when needed. In order to further enhance the reaction rate, heating to not lower than 100° C. may be carried out similarly to the reaction of (A), but the polyvalent monomer (II) sometimes undergoes polymerization.

Even in the case where the aforesaid reactions of (A) to (D) hardly proceed, the unreacted compound (IV) undergoes interaction with the mono(meth)acrylate (I) having an anionic hydrophilic group when the mono(meth)acrylate (I) is contained in the mixture. Therefore, the anionic hydrophilic groups derived from the mono(meth)acrylate (I) can be inclined to a cured product surface that is in contact with the air from the inner part of the cured product (to a film surface that is in contact with the air from a film surface that is in contact with a substrate in the case of a single-layer film formed on a substrate).

It is thought that by incorporating the compound (IV) in the mixture of the polyvalent monomer (II) and the mono(meth) acrylate (I), a reaction product (polyvalent monomer) wherein a sulfonic acid group has been introduced into the polyvalent monomer (II) is produced with high probability. Therefore, it is thought if the mono(meth)acrylate (I) is contained in the monomer composition and if a mixture obtained by mixing the polyvalent monomer (II), the compound (IV), the mono(meth)acrylate (I), etc. is applied to a substrate, a reaction product obtained by the mixing, typically a reaction product in which the aforesaid sulfonic acid group has been introduced, undergoes interaction with the polyvalent monomer (II) having two or more (meth)acryloyl groups and with the mono(meth)acrylate (I) during the course of drying of the solvent contained in the mixture, and therefore, the effect that the mono(meth)acrylate (I) inclines to the coated surface, namely, the surface in contact with the air (to a surface opposite to a substrate contact surface in the case of a single-layer film formed on a substrate) is stabilized, and an uncured product (e.g., composition film) having a favorable inclined structure is obtained.

Further, it is thought that in the case where the mono (meth) acrylate (I) is not contained in the monomer composition, a reaction product (polyvalent monomer) wherein a sulfonic acid group has been introduced into the polyvalent monomer (II) is produced with higher probability as compared with the case where the mono(meth)acrylate is contained. Accordingly, it is thought that even if the mono(meth)acrylate is not contained in the monomer composition but if a mixture obtained by mixing the polyvalent monomer (II), the compound (IV), etc. is applied to a substrate, a reaction product obtained by the mixing, typically a reaction product in which a sulfonic acid group has been introduced, undergoes interaction with the solvent during the course of drying of the solvent contained in the mixture, and with evaporation of the solvent, the reaction product inclines to (concentrates at) a coated material surface that is in contact with the air (to a surface opposite to a substrate contact surface in the case of a single-layer film formed on a substrate), whereby a composition film having an inclined structure is obtained.

By polymerizing such a composition film through the later-described method, a high-quality hydrophilic cured film of the present invention, such as a single-layer film having hydrophilicity, can be obtained.

When the mono(meth)acrylate (I) is contained in the monomer composition, the blending ratio between the mono (meth)acrylate (I) and the polyvalent monomer (II) can be properly determined according to the properties required for the hydrophilic cured product such as a single-layer film. However, they are usually used in a blending ratio (mono (meth)acrylate (I):polyvalent monomer (II)) of 15:1 to 1:1000, preferably 2:1 to 1:1000, more preferably 1:1 to 1:500, still more preferably 1:2 to 1:500, particularly preferably 1:3 to 1:300. In some cases, they are preferably used in a molar ratio (mono(meth)acrylate (I):polyvalent monomer (II)) of 15:1 to 1:30, more preferably 2:1 to 1:20, still more preferably 1:1 to 1:25, particularly preferably 1:1 to 1:15, most preferably 1:3 to 1:23.

Also the blending ratio of the compound (IV) can be properly determined according to the properties required for the hydrophilic cured product such as a single-layer film. However, when the mono(meth)acrylate (I) is not used or when the mono(meth)acrylate is used in a slight amount, the compound (IV) is used usually in an amount of 0.01 to 200 parts by weight, preferably 0.01 to 100 parts by weight, more preferably 0.05 to 80 parts by weight, still more preferably 0.1 to 60 parts by weight, based on 100 parts by weight of the polyvalent monomer (II). When the mono (meth) acrylate (I) is contained in the monomer composition, the compound (IV) may be used usually in an amount of 0.01 to 30 parts by weight, preferably 0.05 to 20 parts by weight, more preferably 0.1 to 10 parts by weight, based on 100 parts by weight of the total amount of the mono(meth)acrylate (I) and the polyvalent monomer (II).

In the monomer composition containing the polyvalent monomer (II) and the compound (IV) and in the monomer composition containing the polyvalent monomer (II), the compound (IV) and the mono(meth)acrylate (I), other monomer (III) different from these components may be contained. The other monomer (III) is a monovalent monomer having a polymerizable unsaturated double bond, which is different from the mono (meth) acrylate (I), or a compound having an iocyanate group, which is different from the mono (meth) acrylate (I) and the polyvalent monomer (II), or the like.

Examples of the other monomers (III) include (meth) acrylic acid, hydroxyethyl (meth)acrylate, hydroxypropyl (meth)acrylate, hydroxybutyl (meth)acrylate, methyl (meth) acrylate, ethyl (meth)acrylate, butyl (meth)acrylate, isobornyl (meth)acrylate, N,N-dimethylaminoethyl (meth) acrylate, N,N-dimethylaminoethyl (meth)acrylate quaternization product, sodium vinyl sulfonate, styrenesulfonic acid, sodium styrenesulfonate, potassium styrenesulfonate, 2-acrylamido-2-methylpropanesulfonic acid, potassium 2-acrylamido-2-methylpropanesulfonate, allyl (meth)acrylate, diethylene glycol bis(allyl carbonate), diallyl phthalate, divinylbenzene, divinylsulfone, glycidyl (meth)acrylate, 3-isopropenyl-α,α-dimethylbenzyl isocyanate, (meth)acryloyl isocyanate, (meth)acryloyloxyethyl isocyanate, xylylene diisocyanate, hexamethylene diisocyanate, bis(isocyanatomethyl)norbornane, isophorone diisocyanate, 1,3-bis(isocyanatomethyl)cylohexane and bis(4-isocyanatocyclohexyl) methane.

Also the blending ratio of the other monomer (III) can be properly determined according to the properties required for the hydrophilic cured product such as a single-layer film. For example, for the purpose of controlling properties such as flexibility and toughness, the other monomer (III) is used usually in an amount of 1 to 100% by mol, preferably 1 to 49% by mol, more preferably 1 to 40% by mol, based on the total number of moles of the mono(meth)acrylate (I) and the polyvalent monomer (II). The other monomer (III) may be used usually in an amount of 1 to 100% by mol, preferably 1 to 49% by mol, more preferably 1 to 40% by mol, based on the total number of moles of the polyvalent monomer (II).

When the hydrophilic cured product of the present invention such as a single-layer film is intended to be used as, for example, an antifogging material, an antifouling material or an antistatic material, or when it is intended to be used for a laminate including this single-layer film, the other monomer (III) can be used usually in an amount of 1 to 49% by mol, preferably 1 to 30% by mol, more preferably 3 to 20% by mol, based on the total number of moles of the polyvalent monomer (II). In the case where the mono (meth) acrylate (I) is contained in the monomer composition, the other monomer (III) may be used usually in an amount 1 to 49% by mol, preferably 1 to 30% by mol, more preferably 3 to 20% by mol, based on the total number of moles of the mono(meth)acrylate (I) and the polyvalent monomer (II).

In the monomer composition containing the polyvalent monomer (II) and the compound (IV) and in the monomer composition containing the polyvalent monomer (II), the compound (IV) and the mono(meth)acrylate (I), additives, such as polymerization initiator, polymerization accelerator, ultraviolet ray absorber, hindered amine light stabilizer (HALS), solvent, catalyst, infrared ray absorber, radical scavenger, internal mold release agent, antioxidant, polymerization inhibitor, dye, binder and leveling agent, may be contained, when needed.

For producing the hydrophilic cured product of the present invention such as a single-layer film from the above mixture, the mixture is polymerized, and when the mixture is polymerized by the use of radiations such as ultraviolet rays, a photopolymerization initiator is added to the mixture. Examples of the photopolymerization initiators include radical photopolymerization initiators, cationic photopolymerization initiators and anionic photopolymerization initiators. Of these photopolymerization initiators, radical photopolymerization initiators are preferable.

Examples of the radical photopolymerization initiators include Irgacure 127 (manufactured by Ciba Specialty Chemicals Inc.), Irgacure 651 (manufactured by Ciba Specialty Chemicals Inc.), Irgacure 184 (manufactured by Ciba Specialty Chemicals Inc.), Dalocure 1173 (manufactured by Ciba Specialty Chemicals Inc.), benzophenone, 4-phenylbenzophenone, Irgacure 500 (manufactured by Ciba Specialty Chemicals Inc.), Irgacure 2959 (manufactured by Ciba Specialty Chemicals Inc.), Irgacure 907 (manufactured by Ciba Specialty Chemicals Inc.), Irgacure 369 (manufactured by Ciba Specialty Chemicals Inc.), Irgacure 1300 (manufactured by Ciba Specialty Chemicals Inc.), Irgacure 819 (manufactured by Ciba Specialty Chemicals Inc.), Irgacure 1800 (manufactured by Ciba Specialty Chemicals Inc.), Dalocure TPO (manufactured by Ciba Specialty Chemicals Inc.), Dalocure 4265 (manufactured by Ciba Specialty Chemicals Inc.), Irgacure OXE01 (manufactured by Ciba Specialty Chemicals Inc.), Irgacure OXE02 (manufactured by Ciba Specialty Chemicals Inc.), Esacure KT55 (manufactured by Lamberti S.p.A.), Esacure ONE (manufactured by Lamberti S.p.A.), Esacure KIP150 (manufactured by Lamberti S.p.A.), Esacure KIP100F (manufactured by Lamberti S.p.A.), Esacure KT37 (manufactured by Lamberti S.p.A.), Esacure KTO46 (manufactured by Lamberti S.p.A.), Esacure 1001M (manufactured by Lamberti S.p.A.), Esacure KIP/EM (manufactured by Lamberti S.p.A.), Esacure DP250 (manufactured by Lamberti S.p.A.), Esacure KB1 (manufactured by Lamberti S.p.A.) and 2,4-diethylthioxanthone.

Of these photopolymerization initiators, preferable are Irgacure 127 (manufactured by Ciba Specialty Chemicals Inc.), Irgacure 184 (manufactured by Ciba Specialty Chemicals Inc.), Dalocure 1173 (manufactured by Ciba Specialty Chemicals Inc.), Irgacure 500 (manufactured by Ciba Specialty Chemicals Inc.), Irgacure 819 (manufactured by Ciba Specialty Chemicals Inc.), Dalocure TPO (manufactured by Ciba Specialty Chemicals Inc.), Esacure ONE (manufactured by Lamberti S.p.A.), Esacure KIP100F (manufactured by Lamberti S.p.A.), Esacure KT37 (manufactured by Lamberti S.p.A.), Esacure KTO46 (manufactured by Lamberti S.p.A.), etc.

Examples of the cationic photopolymerization initiators include Irgacure 250 (manufactured by Ciba Specialty Chemicals Inc.), Irgacure 784 (manufactured by Ciba Specialty Chemicals Inc.), Esacure 1064 (manufactured by Lamberti S.p.A.), CYRACURE UV16990 (Union Carbide Japan K.K.), Adeka Optomer SP-172 (manufactured by Asahi Electrochemical Co., Ltd.), Adeka Optomer SP-170 (manufactured by Asahi Electrochemical Co., Ltd.), Adeka Optomer SP-152 (manufactured by Asahi Electrochemical Co., Ltd.) and Adeka Optomer SP-150 (manufactured by Asahi Electrochemical Co., Ltd.).

The amount of such a photopolymerization initiator used is preferably in the range of 0.1 to 20 parts by weight, more preferably 0.5 to 10 parts by weight, still more preferably 1 to 5 parts by weight, based on 100 parts by weight of the total amount of the polyvalent monomer (II) and the other monomer (III) that is contained when needed. When the mono (meth)acrylate (I) is contained in the monomer composition, the amount of the photopolymerization initiator may be preferably in the range of 0.1 to 20 parts by weight, more preferably 0.5 to 10 parts by weight, still more preferably 1 to 5 parts by weight, based on 100 parts by weight of the total amount of the mono(meth)acrylate (I), the polyvalent monomer (II) and the other monomer (III) that is contained when needed.

When the photopolymerization initiator is used, a photopolymerization accelerator may be used in combination.

Examples of the photopolymerization accelerators include 2,2-bis(2-chlorophenyl)-4,5'-tetraphenyl-2'H-<1,2'>biimidazolyl, tris(4-dimethylaminophenyl)methane, 4,4'-bis(dimethylamino)benzophenone, 2-ethylanthraquinone and camphorquinone.

In order that the hydrophilic cured product of the present invention such as a single-layer film, which is used as, for example, an antifouling material or an antifogging material, may not be changed in properties even if it is exposed outside for a long period of time, it is desirable to prepare a mixture having weathering resistance in which an ultraviolet ray absorber and a hindered amine light stabilizer have been further added to the monomer composition containing the polyvalent monomer (II) and the compound (IV) or to the monomer composition containing the polyvalent monomer (II), the compound (IV) and the mono(meth)acrylate (I).

The ultraviolet ray absorber is not specifically restricted, and various ultraviolet ray absorbers, such as benzotriazole-based ultraviolet ray absorbers, triazine-based ultraviolet ray absorbers, benzophenone-based ultraviolet ray absorbers, benzoate-based ultraviolet ray absorbers, propanedioic acid ester-based ultraviolet ray absorbers and oxanilide-based ultraviolet ray absorbers, can be used.

Examples of the ultraviolet ray absorbers include benzotriazole-based ultraviolet ray absorbers, such as 2-(2H-benzotriazol-2-yl)-p-cresol, 2-(2H-benzotriazol-2-yl)-4-tert-butylphenol, 2-(2H-benzotriazol-2-yl)-4,6-di-tert-butylphenol, 2-(2H-benzotriazol-2-yl)-4,6-bis(1-methyl-1-phenylethyl) phenol, 2-(2H-benzotriazol-2-yl)-4-(1,1,3,3-tetramethylbutyl)-6-(1-methyl-1-phenylethyl)phenol, 2-(2H-benzotriazol-2-yl)-4-(3-one-4-oxa-dodecyl)-6-tert-butylphenol, 2-{5-chloro(2H)-benzotriazol-2-yl}-4-(3-one-4-oxa-dodecyl)-6-tert-butylphenol, 2-{5-chloro(2H)-benzotriazol-2-yl}-4-methyl-6-tert-butylphenol, 2-(2H-benzotriazol-2-yl)-4,6-di-tert-pentylphenol, 2-{5-chloro(2H)-benzotriazol-2-yl}-4,6-di-tert-butylphenol, 2-(2H-benzotriazol-2-yl)-4-tert-octylphenol, 2-(2H-benzotriazol-2-yl)-4-methyl-6-n-dodecylphenol, and a reaction product of methyl-3-{3-(2H-benzotriazol-2-yl)-5-tert-butyl-4-hydroxyphenyl}propionate/polyethylene glycol 300; triazine-based ultraviolet ray absorbers, such as 2-(4-phenoxy-2-hydroxyphenyl)-4,6-diphenyl-1,3,5-triazine, 2-(2-hydroxy-4-oxa-hexadecyloxy)-4,6-di(2,4-dimethylphenyl)-1,3,5-triazine, 2-(2-hydroxy-4-oxa-heptadecyloxy)-4,6-di(2,4-dimethylphenyl)-1,3,5-triazine, 2-(2-hydroxy-4-isooctyloxy-phenyl)-4,6-di(2,4-dimethylphenyl)-1,3,5-triazine, Tinuvin 400 (trade name, manufactured by Ciba Specialty Chemicals K.K.), Tinuvin 405 (trade name, manufactured by Ciba Specialty Chemicals K.K.), Tinuvin 460 (trade name, manufactured by Ciba Specialty Chemicals K.K.), and Tinuvin 479 (trade name, manufactured by Ciba Specialty Chemicals K.K.); benzophenone-based ultraviolet ray absorbers, such as 2-hydroxy-4-n-octoxybenzophenone; benzoate-based ultraviolet ray absorbers, such as 2,4-di-tert-butylphenyl-3,5-di-tert-butyl-4-hydroxybenzoate; propanedioic acid ester-based ultraviolet ray absorbers, such as propanedioic acid-{(4-methoxyphenyl)-methylene}-dimethyl ester, Hostavin PR-25 (trade name, manufactured by Clariant Japan Co., Ltd.), and Hostavin B-CAP (trade name, manufactured by Clariant Japan Co., Ltd.); and oxanilide-based ultraviolet ray absorbers, such as 2-ethyl-2'-ethoxyoxanilide, and Sanduvor VSU (trade name, manufactured by Clariant Japan Co., Ltd.). Of these ultraviolet ray absorbers, triazine-based ultraviolet ray absorbers tend to be preferable.

The hindered amine light stabilizer (abbreviation: HALS) is a generic name for compounds usually having a 2,2,6,6-tetramethylpiperidine skeleton, and such hindered amine light stabilizers are broadly divided into low-molecular weight HALS, medium-molecular weight HALS, high-molecular weight HALS and reactive HALS, on the basis of the molecular weight.

Examples of the hindered amine light stabilizers include Tinuvin 111FDL (trade name, manufactured by Ciba Specialty Chemicals K.K.), bis(1-octyloxy-2,2,6,6-tetramethyl-4-piperidyl)sebacate (Tinuvin 123 (trade name), manufactured by Ciba Specialty Chemicals K.K.), Tinuvin 144 (trade name, manufactured by Ciba Specialty Chemicals K.K.), Tinuvin 292 (trade name, manufactured by Ciba Specialty Chemicals K.K.), Tinuvin 765 (trade name, manufactured by Ciba Specialty Chemicals K.K.), Tinuvin 770 (trade name, manufactured by Ciba Specialty Chemicals K.K.), N,N'-bis(3-aminopropyl)ethylenediamine-2,4-bis[N-butyl-N-(1,2,2,6,6-pentamethyl-4-pyperidyl)amino]-6-chloro-1,3,5-triazine condensate (CHIMASSORB 119FL (trade name), manufactured by Ciba Specialty Chemicals K.K.), CHIMASSORB 2020FDL (trade name, manufactured by Ciba Specialty Chemicals K.K.), dimethyl succinate-1-(2-hydroxyethyl)-4-hydroxy-2,2,6,6-tetramethylpiperidine polycondensate (CHIMASSORB 622LD (trade name), manufactured by Ciba Specialty Chemicals K.K.), poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}] (CHIMASSORB 944FD (trade name), manufactured by Ciba Specialty Chemicals K.K.), Sanduvor 3050 Liq. (trade name, manufactured by Clariant Japan Co., Ltd.), Sanduvor 3052 Liq. (trade name, manufactured by Clariant Japan Co., Ltd.), Sanduvor 3058 Liq. (trade name, manufactured by Clariant Japan Co., Ltd.), Sanduvor 3051 Powder (trade name, manufactured by Clariant Japan Co., Ltd.), Sanduvor 3070 Powder (trade name, manufactured by Clariant Japan Co., Ltd.), VP Sanduvor PR-31 (trade name, manufactured by Clariant Japan Co., Ltd.), Hostavin N20 (trade name, manufactured by Clariant Japan Co., Ltd.), Hostavin N24 (trade name, manufactured by Clariant Japan Co., Ltd.), Hostavin N30 (trade name, manufactured by Clariant Japan Co., Ltd.), Hostavin N321 (trade name, manufactured by Clariant Japan Co., Ltd.), Hostavin PR-31 (trade name, manufactured by Clariant Japan Co., Ltd.), Hostavin 845 (trade name, manufactured by Clariant Japan Co., Ltd.), and Nylostab S-EED (trade name, manufactured by Clariant Japan Co., Ltd.).

The amounts of the ultraviolet ray absorber and the hindered amine light stabilizer added are not specifically restricted. However, the ultraviolet ray absorber is added usually in an amount of 0.1 to 20 parts by weight, preferably 0.5 to 10 parts by weight, and the hindered amine light stabilizer is added usually in an amount of 0.1 to 10 parts by weight, preferably 0.5 to 5 parts by weight, more preferably 1 to 3 parts by weight, each amount being based on 100 parts by weight of the total amount of the polyvalent monomer (II) and the other monomer (III) that is contained when needed. When the mono (meth) acrylate (I) is contained in the monomer composition, the ultraviolet ray absorber is added usually in an amount of 0.1 to 20 parts by weight, preferably 0.5 to 10 parts by weight, and the hindered amine light stabilizer is added usually in an amount of 0.1 to 10 parts by weight, preferably 0.5 to 5 parts by weight, more preferably 1 to 3 parts by weight, each amount being based on 100 parts by weight of the total amount of the mono(meth)acrylate (I), the polyvalent monomer (II) and the other monomer (III) that is contained when needed.

When the amounts of the ultraviolet ray absorber and the hindered amine light stabilizer added are in the above ranges, polymerization of mixtures, such as a monomer composition containing the polyvalent monomer (II) and the compound (IV) and a monomer composition containing the polyvalent monomer (II), the compound (IV) and the mono (meth) acrylate (I), is sufficiently carried out, and the effect on improving weathering resistance of the resulting hydrophilic cured product such as a single-layer film is increased. If the amounts of the ultraviolet ray absorber and the hindered amine light stabilizer added are less than the lower limits of the above ranges, the effect on improving weathering resistance of the resulting hydrophilic cured product such as a single-layer film tends to be decreased. On the other hand, if the amounts of the ultraviolet ray absorber and the hindered amine light stabilizer added exceed the upper limits of the above ranges, polymerization of the monomer compositions are sometimes insufficient.

The solvent which can be mixed with the monomer compositions is not specifically restricted as far as a cured product having a hydrophilic surface is obtained, but solvents having too strong interaction such that they react with the constituents contained in the monomer compositions used in the present invention or they form salts together with the constituents are undesirable.

For example, ethanolamine-based compounds having a hydroxyethylamino structure [$NR_aR_b(CH_2CH_2CH)$ wherein $R_a$ and $R_b$ are each independently hydrogen, an alkyl group of 1 to 15 carbon atoms or a $CH_2CH_2OH$ group], such as ethanolamine, diethanolamine, triethanolamide, N-ethylethanolamine, N-(2-ethylhexyl)ethanolamine, N-butyl-diethanolamine, N-hexyl-diethanolamine, N-lauryl-diethanolamine and N-cetyl-diethanolamine, are liable to form salts or analogues to salts together with anionic hydrophilic groups such as a sulfonic acid group and are difficult to evaporate. Therefore, even if such a solvent is intended to be removed from the mixture applied, it rarely moves to the surface that is in contact with the air and tends to remain inside. Hence, the reaction product wherein a sulfonic acid group has been introduced into the polyvalent monomer (II), or the mono(meth) acrylate (I) having an anionic hydrophilic group in the case of the monomer composition containing the mono(meth)acrylate (I), tends to rarely undergo inclination to (concentration at) the coated material surface that is in contact with the air. On that account, the ethanolamine-based compounds are undesirable as the solvents.

Examples of the solvents include polar solvents, e.g., monohydric alcohols, such as methanol, ethanol, isopropanol (IPA), 2-propanol, 1-butanol, isobutanol, 2-butanol, 1-pentanol (1-amyl alcohol), isopentanol, 2-methyl-1-butanol, benzyl alcohol, tetrahydrofurfuryl alcohol and cyclohexanol, and polyhydric alcohols, such as ethylene glycol, 1,3-propylene glycol, 1,2-propylene glycol and glycerol;

ketones, such as cyclohexanone, 2-methylcyclohexanone and acetone;

carboxylic acids, such as formic acid, acetic acid and propionic acid;

carboxylic acid esters, such as methyl acetate, ethylene glycol monoacetate and ethylene glycol diacetate;

carbonic acid esters, such as ethylene carbonate and 1,2-propylene carbonate;

ethers, such as dioxane, anisole and alkylene glycol dimethyl ether;

alkoxy alcohols, such as alkoxyethanols, specifically, 2-methoxy-1-ethanol (methoxyethanol) and 2-ethoxy-1-ethanol (ethoxyethanol), and alkoxypropanols, specifically, 2-methoxy-1-propanol (methoxypropanol);

aprotic sulfones, such as sulfolane;

aprotic sulfoxides, such as DMSO (dimethyl sulfoxide);

amides, such as N,N'-dimethylformamide (DMF), N,N'-dimethylimidazolidinone(DMI) and N,N'-dimethylacetamide (DMAC);

nitriles, such as acetonitrile and butylonitrile; and water, and mixtures of water and the above compounds, such as a mixture of water and an alcohol.

The above solvents are solvents having relatively high polarity, and when a mixture of the monomer composition of the present invention and a solvent is prepared, a solvent having high polarity tends to be preferable. When a solvent having high polarity is mixed with the monomer composition, the reaction product wherein a sulfonic acid group has been introduced into the polyvalent monomer (II) or the mono (meth)acrylate (I) having an anionic hydrophilic group in the case of the monomer composition containing the mono(meth) acrylate (I) inclines to (concentrates at) the coated material surface (to a surface opposite to a substrate contact surface when a mixture containing the monomer composition is applied to a substrate) with removal of the solvent from the coated material surface that is in contact with the air during the course of removing the solvent from the mixture applied, whereby an inclined structure is formed. On that account, in order that the above inclination (concentration) may easily occur, the solvent preferably has a proper interaction with the anionic hydrophilic group contained in the monomer composition.

As an indication showing such polarity, a solubility parameter (SP value) is widely known. The solubility parameter (SP value) can be easily calculated by a simple calculation method described below.

Calculation formula of solubility parameter $\sigma$

1) Evaporation latent heat based on 1 mol $Hb=21\times(273+Tb)$ (unit: cal/mol),$Tb$: boiling point (° C.)

2) Evaporation latent heat based on 1 mol at 25° C.

$H25=Hb\times\{1+0.175\times(Tb-25)/100\}$ (unit: cal/mol),$Tb$: boiling point (° C.)

3) Intermolecular bond energy $E=H25-596$ (unit: cal/mol)

4) Intermolecular bond energy based on 1 ml (cm$^3$) of solvent $E1=E\times D/Mw$ (unit: cal/cm$^3$),D: density (g/cm$^3$),MW: molecular weight 5) Solubility parameter (SP value)

$\sigma=(E1)^{1/2}$ (unit: cal/cm$^3$)

Of the above polar solvents, solvents having a solubility parameter (SP value) $\sigma$ (cal/cm$^3$), as measured by the simple calculation method, of not less than 9.3 are preferable, and solvents having a solubility parameter of not less than 9.5 are more preferable. If the mixture containing the mono(meth) acrylate (I), the polyvalent monomer (II) and the compound (IV) and containing a large amount of a solvent having a solubility parameter (SP value) of less than the above value is applied to a substrate or the like to form a coating film, the structure of the resulting hydrophilic cured product of the present invention such as a single-layer film, specifically an inclined structure (concentration at the surface) of anionic hydrophilic groups, is liable to become incomplete, and the hydrophilicity tends to be lowered.

Examples of the solvents having a solubility parameter of the preferred range include methanol, ethanol, 1-propanol, isopropanol (IPA), 1-butanol, isobutanol, 1-pentanol (1-amyl alcohol), cyclohexanol; cyclohexanone; 2-methoxyl-1-propanol (methoxypropanol), 2-methoxyl-1-ethanol (methoxyethanol), 2-ethoxy-1-ethanol (ethoxyethanol); DMF (N,N'-dimethylformamide); acetonitrile; and water.

When the solvent is a mixed solvent containing two or more compounds, it is enough that at least one of the compounds satisfies the above conditions of solubility parameter. The reason is as follows. When this one compound contained in the solvent satisfies the above conditions of solubility parameter, the reaction product wherein a sulfonic acid group has been introduced into the polyvalent monomer (II) or the anionic hydrophilic group derived from the mono(meth)acrylate (I) having an anionic hydrophilic group in the case of the monomer composition containing the mono(meth)acrylate, and this one compound contained in the solvent have a prescribed interaction, so that when a mixture containing this monomer composition is applied to a substrate or the like and the solvent is removed from the mixture, the anionic hydrophilic groups move to the applied mixture surface that is in contact with the air as usual, together with this one compound, and as a result, the anionic hydrophilic groups are concentrated at the surface.

The amount of the solvent contained in the mixture is properly determined taking into consideration properties of the hydrophilic cured product obtained by the present invention such as single-layer film, economy, etc.

The amount of the solvent used is usually in range of 1 to 99% by weight, preferably 10 to 90% by weight, more preferably 20 to 80% by weight, still more preferably 30 to 70% by weight, in terms of concentration (solid matters/(solid matters+solvent)×100) of solid matters (total amount of the polyvalent monomer (II), the compound (IV), the monomer (I) that is contained when needed, the monomer (III) that is contained when needed, and the additives) contained in the mixture containing the monomer composition.

When the mixture containing the solvent is polymerized to form the hydrophilic cured product of the present invention such as a single-layer film, it is preferable to sufficiently carry out drying of the mixture after application of the mixture containing the monomer composition to a substrate or the like and before the later-described polymerization, in order to remove the solvent. If the drying of the mixture is insufficient, the reaction product wherein a sulfonic acid group has been introduced into the polyvalent monomer (II) or the anionic hydrophilic group derived from the mono (meth) acrylate having an anionic hydrophilic group in the case of the monomer composition containing the mono(meth)acrylate (I) undergoes less moving to the coated material surface that is in contact with the air, so that the resulting hydrophilic cured product tends to have lower hydrophilicity. Even in the case where the anionic hydrophilic groups move to the coated material surface that is in contact with the air, an interaction that is repulsion between the anionic hydrophilic groups and the atmosphere (hydrophobic) present on the surface in contact with the air is exerted if the solvent remains in the mixture, and hence, the anionic hydrophilic groups tend to more easily move to the inner part of the coated material. On that account, inclination of the anionic hydrophilic groups to the surface of the resulting hydrophilic cured product such as a single-layer film, said surface being in contact with the air, sometimes becomes insufficient, and the hydrophilicity is sometimes lowered, and besides, the adhesion to the substrate tends to be lowered. Therefore, the amount of the solvent remaining in the mixture immediately before the polymerization tends to be preferably smaller, and is usually not more than 10% by weight, preferably not more than 5% by weight, more preferably not more than 3% by weight, still more preferably not more than 1% by weight.

Although the drying temperature is properly determined, it is usually in the range of room temperature to 200° C., preferably 30 to 150° C., more preferably 40 to 100° C.

The time for drying the mixture is properly determined, but when productivity is taken into consideration, a shorter time tends to be preferable. For example, the mixture is usually dried for not longer than 10 minutes, preferably not longer than 5 minutes, more preferably not longer than 3 minutes, still more preferably not longer than 2 minutes.

The drying may be carried out in the atmosphere or in an atmosphere of an inert gas such as nitrogen. However, a lower ambient humidity tends to be preferable because the resulting hydrophilic cured product (e.g., single-layer film) does not have a bad appearance (orange peel surface, low transparency, etc.). Specifically, the ambient humidity is preferably not more than 70%, more preferably not more than 60%, still more preferably not more than 55%.

When the solvent is removed by means of airflow, the airflow velocity is preferably not more than 30 m/sec, more preferably 0.1 to 30 m/sec, still more preferably 0.2 to 20 m/sec, particularly preferably 0.3 to 10 m/sec.

The pressure in the drying is not specifically restricted and is relatively preferably normal pressure or reduced pressure. However, the drying may be carried out under a slight pressure.

To the monomer composition containing the polyvalent monomer (II) and the compound (IV) and to the monomer composition containing the polyvalent monomer (II), the compound (IV) and the mono(meth)acrylate (I), additives other than the above additives may be added, when needed. For example, for the purpose of enhancing mechanical and thermal strength or imparting optical response properties and germicidal function, silica, titanium oxide, other metals, other metal oxides, etc. may be added, or for the purpose of heightening a refractive index of a resin composition obtained by polymerizing the mixture, a monomer having a sulfur atom may be added, or for the purpose of imparting germicidal function or antibacterial function, salts of metals such as silver and lithium, iodine, iodonium salt, etc. may be added to the composition.

Although the amount of these additives can be properly determined according to the use purpose, it is usually in the range of 0.01 to 200% by weight, preferably 0.1 to 100% by weight, based on 100 parts by weight of the total amount of the polyvalent monomer (II) and the other monomer (III) that is contained when needed. When the mono(meth)acrylate (I) is contained in the monomer composition, the amount of the additives is usually in the range of 0.01 to 200% by weight, preferably 0.1 to 100% by weight, based on the total mass of the mono(meth)acrylate (I), the polyvalent monomer (II) and the monomer (III) that is contained when needed.

By applying the mixture containing the polyvalent monomer (II) and the compound (IV) or the mixture containing the polyvalent monomer (II), the compound (IV) and the mono (meth) acrylate (I) to a substrate or the like and polymerizing the mixture, the hydrophilic cured product of the present invention such as a single-layer film is obtained. The polymerization process is not specifically restricted, and for example, polymerization can be carried out using heat or radiation or using both of them.

The polymerization can be carried out in the atmosphere, but it is preferable to carry out the polymerization in an atmosphere of an inert gas such as nitrogen because the polymerization time can be shortened.

When the polymerization is carried out using heat, a thermal radical generator such as an organic peroxide is usually added to the mixture containing the monomer composition and they are heated at a temperature in the range of room temperature to 300° C.

When the polymerization is carried out using radiation, energy rays in the wavelength region of 0.0001 to 800 nm can be used as the radiation. The radiations are classified into α-rays, β-rays, γ-rays, X-rays, electron rays, ultraviolet rays, visible rays, etc., and they can be properly selected and used according to composition of the mixture. Of these radiations, ultraviolet rays are preferable, and an output peak of the ultraviolet rays is preferably in the range of 200 to 450 nm, more preferably 230 to 445 nm, still more preferably 240 to 430 nm, particularly preferably 250 to 400 nm. When the ultraviolet rays having an output peak of the above range are used, troubles, such as yellowing and heat distortion during the polymerization, are few, and also in the case of adding an ultraviolet ray absorber, polymerization can be completed in a relatively short period of time.

When an ultraviolet ray absorber and a hindered amine stabilizer are added to the monomer composition, it is preferable to use ultraviolet rays having an output peak in the range of 250 to 280 nm or 370 to 430 nm.

When the polymerization of the monomer composition is carried out using radiation, it is possible that after the mixture is applied to a substrate or the like and then dried when needed, the coated layer is covered with a covering material (film or the like) and irradiated with radiation to perform polymerization, for the purpose of avoiding polymerization inhibition caused by oxygen. When the coated layer is covered with a covering material, it is desirable to allow the covering material and the coated layer to closely adhere to each other so that air (oxygen) may not be introduced between the coated layer and the covering material. Cutoff of air sometimes reduces, for example, the amount of the (photo) polymerization initiator and the radiation irradiation dose.

As the covering material, a covering material made of any material or in any shape may be used provided that oxygen is cut off, but from the viewpoint of handling properties, a film is preferable. Of the films, a transparent film is preferable because radiation polymerization is easily carried out. The thickness of the film is usually in the range of 3 to 200 μm, preferably 5 to 100 μm, more preferably 10 to 50 μm.

Examples of materials of the films preferably used as the covering materials include vinyl alcohol-based polymers, such as polyvinyl alcohol (PVA) and an ethylene/vinyl alcohol copolymer, polyacrylamide, polyisopropylacrylamide, polyacrylonitrile, polycarbonate (PC), polymethyl methacrylate (PMMA), polyethylene terephthalate (PET), polystyrene (PS), and biaxially oriented polypropylene (OPP).

Although the apparatus is expensive, use of electron rays of 0.01 to 0.002 nm as radiation is preferable because the polymerization can be completed in a short period of time.

In a single-layer film composed of the hydrophilic cured product of the present invention obtained as above, the degree of inclination (anion concentration ratio) (Sa/Da) of a surface concentration (Sa) of sulfonic acid groups, carboxyl groups and phosphoric acid groups that are anionic hydrophilic groups in the single-layer film to a deep part concentration (Da) of these anionic hydrophilic groups at the position of ½ of the film thickness of the single layer film is usually not less than 1.1.

The degree of inclination (anion concentration ratio) (Sa/Da) is preferably not less than 1.2, more preferably not less than 1.3. The degree of inclination (anion concentration ratio) (Sa/Da) is usually not more than 20.0.

The single-layer film of the present invention is provided as a film having anionic hydrophilic groups, which is usually formed on at least one surface of a substrate. In this single-layer film, the anionic hydrophilic groups are distributed from the film deep part on the substrate side to the film surface, and the single-layer film has a difference in concentration (degree of inclination (anion concentration ratio) (Sa/Da)) so that a large number of anionic hydrophilic groups may be distributed at its outermost surface that is in contact with the air The reason is thought to be that when the mixture containing the polyvalent monomer (II) and the, compound (IV) or the mixture containing the polyvalent monomer (II), the compound (IV) and the mono(meth)acrylate (I) is applied to a substrate or the like and polymerized by heat, radiation or the like, the anionic hydrophilic groups having hydrophilicity undergo self-assembly at the surface that is in contact with the air, and then a film composed of a cured product made from the resin composition is formed.

In the case of a single-layer film composed of a cured product obtained by polymerizing a mixture containing the mono(meth)acrylate (I) and the polyvalent monomer (II) but not containing the compound (IV), distribution of the anionic hydrophilic groups in the single-layer film relatively largely varies and is not stabilized occasionally if the conditions for applying the mixture to a substrate or the like are changed. In an extreme case, the mono(meth)acrylate (I) excessively inclines to the surface that is in contact with the air, and as a result, bleedout occurs, and the transparency is sometimes lowered. However, in the hydrophilic cured product of the present invention (e.g., a single-layer film) obtained by polymerizing a mixture containing the compound (IV), such a phenomenon rarely occurs, and a hydrophilic cured product (e.g., single-layer film) having the aforesaid anion concentration ratio can be stably produced.

In the case of a cured product (e.g., a single-layer film) obtained by polymerizing a mixture comprising the polyvalent monomer (II) but not containing the compound (IV) and the mono (meth) acrylate (I), an inclined structure of the anionic hydrophilic groups is not formed, so that hydrophilization is difficult.

In the single-layer film composed of the hydrophilic cured product of the present invention, anions of highly hydrophilic groups are present at the surface in a high concentration, and therefore, the single-layer film is excellent in antifogging properties, antifouling properties or self-cleaning properties, antistatic properties or dust adhesion prevention properties, etc.

The degree of inclination (anion concentration ratio) is determined in the following manner. A prescribed single-layer film sample is obliquely cut, then the concentrations of sulfonic acid groups, carboxyl groups and phosphoric acid groups that are anionic hydrophilic groups at a single-layer film surface that is in contact with the air and at the position of ½ of the film thickness of the single-layer film are measured by the use of a time-of-flight secondary ion mass analyzer (TOF-SIMS), and using the measured values, the degree of inclination is calculated.

The water contact angle of the single-layer film composed of the hydrophilic cured product of the present invention is usually not more than 30°, preferably not more than 20°, more preferably not more than 10°.

The single-layer film having a water contact angle of not more than the above numerical value has high hydrophilicity, is apt to have affinity for water (is apt to be wetted) and is excellent as a hydrophilic material. On that account, the single-layer film is useful as, for example, an antifogging material, an antifogging film, (also referred to as an "antifogging coat" hereinafter), an antifouling material, an antifouling film, a self-cleaning coat, an antistatic material, an antistatic film, a dust adhesion preventive coat, or the like. When the single-layer film is used as, for example, an antifogging coat, it exerts an excellent antifogging effect because water droplets spread out on the film surface and a water film can be formed. When the single-layer film is used as a self-cleaning coat, it exerts an excellent antifouling effect because water comes between a stain and the coating surface and makes the stain float to remove the stain.

Since the single-layer film of the present invention has anionic hydrophilic groups, it exhibits excellent antistatic properties as compared with conventional films having nonionic hydrophilic groups, and the single-layer film is useful also as an antistatic material, an antistatic film, a dust adhesion preventive coat, or the like.

When the water contact angle is not more than 20°, preferably not more than 10°, the single-layer film composed of the hydrophilic cured product of the present invention is particularly preferably used as an antifogging material, an antifouling material or an antistatic material. The water contact angle is usually not less than 0°.

The hydrophilic cured product obtained by the present invention such as a single-layer film has not only high surface hardness but also high transparency, and the resulting hydrophilic cured product such as a single-layer film is rarely cracked.

In a cured product (e.g., a single-layer film) obtained by polymerizing a mixture containing the mono (meth) acrylate (I) and the polyvalent monomer (II) but not containing the compound (IV), distribution of the anionic hydrophilic groups in the hydrophilic cured product such as single-layer film relatively largely varies and is not stabilized occasionally if the conditions for applying the mixture to a substrate or the like are changed. In an extreme case, the moving rate of the mono (meth) acrylate (I) is too high, and the mono (meth) acrylate (I) excessively inclines to the surface that is in contact with the air. As a result, bleedout of the mono (meth) acrylate (I) occurs during the polymerization, and thereby the hydrophilic cured product such as a single-layer film loses transparency, or because the anionic hydrophilic groups are unevenly dispersed, the film is liable to be cracked, or the adhesion between the substrate and the hydrophilic cured product such as a single-layer film is impaired in some cases.

However, in the hydrophilic cured product of the present invention (e.g., a single-layer film) obtained by polymerizing the mixture containing the compound (IV), the mercapto group, the hydroxyl group or the amino group of the compound (IV) typically undergoes Michel addition reaction preferentially with the (meth)acryloyl group contained in the polyvalent monomer (II).

On that account, in the case of, for example, the mixture containing the polyvalent monomer (II), the compound (IV) and the mono(meth)acrylate (I), the formed reaction product contained in the coated material on a substrate or the like and having a sulfonic acid group and an acryloyl group undergoes interaction with the mono(meth)acrylate (I) having an anionic hydrophilic group, which is present around the reaction product, to thereby relax the moving rate of the mono (meth)acrylate (I) to the surface that is in contact with the air, and therefore, even if the conditions for applying the mixture containing the monomer composition and the conditions for removing the solvent (e.g., evaporation conditions) vary, rapid concentration (inclination) of the mono(meth)acrylate (I) to the surface in contact with the air is inhibited, so that bleedout of a component containing anionic hydrophilic groups from the hydrophilic cured product is inhibited. As a result, an inclined structure in which the anionic hydrophilic groups are homogeneously dispersed all over the hydrophilic cured product such as a single-layer film is stably formed, and even if the thickness of the resulting hydrophilic cured product (e.g., single-layer film) is increased, the transparency tends to be maintained.

In the case where a hydrophilic cured product such as a single-layer film is prepared from a mixture containing the polyvalent monomer (II) and the mono(meth)acrylate (I) but not containing the compound (IV), the amount of the hydrophilic mono(meth)acrylate (I) that inclines to (concentrates at) the surface sometimes becomes insufficient even if the specific surface area of the hydrophilic cured product is increased (e.g., the film thickness of the single-layer film is decreased). As a result, phase separation between a phase containing the hydrophilic mono(meth)acrylate (I) as a main component and a phase containing the hydrophobic polyvalent monomer (II) as a main component occurs at the surface that is in contact with the air, and the transparency is liable to be impaired.

On the other hand, when a hydrophilic cured product such as a single-layer film is prepared from a mixture containing the compound (IV) in addition to the polyvalent monomer (II) and the mono(meth)acrylate (I), the formed reaction product itself, which has a hydrophilic sulfonic acid group and an acryloyl group, also undergoes inclination (concentration), whereby a hydrophilic component is further supplemented in addition to the mono(meth)acrylate (I) at the surface that is in contact with the air. Moreover, the hydrophilic mono(meth)acrylate (I) and the hydrophobic polyvalent monomer (II) undergo interaction and become compatible in each other, whereby phase separation is inhibited and the transparency tends to be maintained.

In the case where a hydrophilic cured product such as a single-layer film is prepared from a mixture containing the polyvalent monomer (II) and the compound (IV) but not containing the mono(meth)acrylate (I), the formed reaction product itself, which is contained in the coated material on a substrate or the like and has a sulfonic acid group and an acyloyl group, moves to the surface that is in contact with the air, but the reaction product has a lower molecular weight than the mono(meth)acrylate (I), and has a low moving rate. Therefore, rapid concentration (inclination) at the surface that is in contact with the air is inhibited, and even if the thickness of the resulting hydrophilic cured product (e.g., single-layer film) is increased, lowering of transparency due to bleedout rarely occurs, and the transparency tends to be maintained. Further, even in the case where the specific surface area of the hydrophilic cured product is increased (e.g., the film thickness of the single-layer film is decreased), the formed reaction product having a sulfonic acid group and an acryloyl group usually undergoes stronger interaction with the polyvalent monomer (II) and exhibits higher solubility than the mono (meth)acrylate (I), and therefore, even if the reaction product inclines to (concentrates at) the surface that is in contact with the air, phase separation between the reaction product and the polyvalent monomer (II) rarely occurs, and the transparency is sometimes maintained.

It is presumed that although a hydrophilic portion derived from the mono(meth)acrylate (I) ought to usually have low hydrophilicity and repel a hydrophobic portion derived from the polyvalent monomer (II), a reaction product of the compound (IV) with the polyvalent monomer (II) is present and this reaction product undergoes hydrophilic interaction with not only the mono(meth)acrylate (I) but also the polyvalent monomer (II), whereby the cured product such as a single-layer film is improved in toughness as compared with the conventional ones, comes to be rarely cracked and is improved also in abrasion resistance.

Although the thickness of the hydrophilic cured product of the present invention, typically a single-layer film (copolymer), can be properly determined according to the use purpose, it is usually in the range of 0.05 to 500 μm, preferably 0.1 to 300 μm, more preferably 0.5 to 100 μm, still more preferably 1 to 30 μm, particularly preferably 2 to 15 μm.

Although the method for forming the hydrophilic cured product of the present invention such as a single-layer film is not specifically restricted, the hydrophilic cured product can be formed by applying the monomer composition containing, for example, the mono(meth)acrylate (I), the polyvalent monomer (II) and the compound (IV) to a substrate surface, then drying the composition when needed and then polymerizing the composition.

Examples of the substrates include substrates made of inorganic materials, such as glass, silica, metal and metal oxide, substrates made of organic materials, such as polymethyl methacrylate, polycarbonate, polyethylene terephthalate, polyethylene, polypropylene, polystyrene, polyurethane resin, epoxy resin, vinyl chloride resin, silicone resin, paper and pulp, and substrates having a coating material cured product layer, in each of which a surface of a substrate made of the above inorganic material or organic material has been coated with a coating material.

For the purpose of activating the substrate surface, the substrate surface can be subjected to physical or chemical treatments, such as corona treatment, ozone treatment, low-temperature plasma treatment using oxygen gas, nitrogen gas or the like, glow discharge treatment, oxidation treatment with chemicals and flame treatment, when needed. Instead of these treatments or in addition to these treatments, the substrate surface may be subjected to primer coating treatment, undercoating treatment or anchor coating treatment.

Examples of coating agents used for the primer coating treatment, the undercoating treatment and the anchor coating treatment include coating agents using, as main components of vehicles, resins such as polyester-based resin, polyamide-based resin, polyurethane-based resin, epoxy resin, phenolic resin, (meth)acrylic resin, polyvinyl acetate-based resin, polyolefin-based resin (e.g., polyethylene and polypropylene) or copolymer thereof or modified resin thereof, and cellulose-based resin. The coating agent may be any of a solvent type coating agent and an aqueous coating agent.

Of these coating agents, preferable are:

modified polyolefin-based coating agent, ethyl vinyl alcohol-based coating agent, polyethyleneimine-based coating agent, polybutadiene-based coating agent, polyurethane-based coating agent;

polyester-based polyurethane emulsion coating agent, polyvinyl chloride emulsion coating agent, urethane acrylic emulsion coating agent, silicon acrylic emulsion coating agent, vinyl acetate acrylic emulsion coating agent, acrylic emulsion coating agent;

rubber-based latex coating agents, such as styrene/butadiene copolymer latex coating agent, acyrylonitrile/butadiene copolymer latex coating agent, methyl methacrylate/butadiene copolymer latex coating agent, chloroprene latex coating agent and polybutadiene latex, polacrylic acid ester latex coating agent, polyvinylidene chloride latex coating agent, polybutadiene latex coating agent, and coating agents comprising carboxylic acid modified product latexes or dispersions of resins contained in these latex coating agents.

These coating agents can be applied by, for example, gravure coating method, reverse roll coating method, knife coating method or kiss-roll coating method, and the amount of them applied to a substrate is usually 0.5 g/m$^2$ to 5 g/m$^2$ in a dry state.

Of these coating agents, polyurethane-based coating agent is more preferable. The polyurethane-based coating agent has a urethane bond in a main chain or a side chain of a resin contained in the coating agent. The polyurethane-based coating agent is a coating agent containing polyurethane obtained by, for example, reacting a polyol, such as polyester polyol, polyether polyol or acrylic polyol, with an isocyante compound.

Of such polyurethane-based coating agents, polyurethane-based coating agents obtained by mixing polyester polyols, such as condensation type polyester polyol and lactone-based polyester polyol, with isocyanate compounds, such as tolylene diisocyanate, hexamethylene diisocyanate and xylene diisocyanate, are preferable because they have excellent adhesion properties.

The method for mixing the polyol compound with the isocyanate compound is not specifically restricted. The blending ratio is not specifically restricted either, but if the amount of the isocyanate compound is too small, curing failure is sometimes brought about, and therefore, the ratio of OH groups of the polyol compound to NCO groups of the isocyanate compound is preferably in the range of 2/1 to 1/40 in terms of equivalents.

The substrate in the present invention may have a substrate surface having been subjected to surface activation treatment.

A single-layer film composed of the hydrophilic cured product of the present invention and formed on a substrate surface as above can be used for a laminate including a substrate and a single-layer film. When the single-layer film is, for example, an antifogging film, an antifouling film or an antistatic film, a laminate in which a substrate is coated with the antifogging film, the antifouling film or the antistatic film is obtained.

When the substrate is a film, the later-described adhesive layer can be provided on a surface on which the single-layer film of the present invention is not formed, and on the surface of the adhesive layer, a release film may be further provided. By laminating an adhesive layer on one surface of the substrate film, the laminated film having the single-layer film of the present invention can be easily applied, as an antifogging film or an antifouling film, to glass, mirror in a bath room or the like, surfaces of display materials such as display and television, guide plates such as sign board, advertisement and guide plate, signs of railways, roads or the like, outer wall of building, window glass, etc.

The adhesive used for the adhesive layer is not specifically restricted, and a publicly known adhesive can be used. Examples of the adhesives include acrylic adhesives, rubber-based adhesives, vinyl ether polymer-based adhesives and silicone adhesives. The thickness of the adhesive layer is usually in the range of 2 to 50 μm, preferably 5 to 30 μm.

In the single-layer film of the present invention and in the laminate in which the single-layer film is laminated, a single layer film surface that is in contact with the air may be covered with a covering material. In the single-layer film covered with a covering material and in the laminate including the single-layer film, the single-layer film can be prevented from being damaged or stained when they are transported, stored or displayed.

As the covering material, the aforesaid covering material, which is allowed to closely adhere when the single-layer film of the present invention is formed on a substrate or the like by radiation polymerization, can be also used as it is.

Examples of materials of films preferably used as the covering materials include vinyl alcohol-based polymers, such as polyvinyl alcohol (PVA) and an ethylene/vinyl alcohol copolymer, polyacrylamide, polyisopropylacrylamide, polyacrylonitrile, polycarbonate (PC), polymethyl methacrylate (PMMA), polyethylene terephthalate (PET), polystyrene (PS), and biaxially oriented polypropylene (OPP).

By polymerizing the mixture containing the monomer composition containing the polyvalent monomer (II) and the compound (IV) or the monomer composition containing the polyvalent monomer (II), the compound (IV) and the mono (meth)acrylate (I) in molds of various shapes, cured products having various shapes, such as a single-layer film and a molded product, can be also obtained.

The hydrophilic cured products obtained by the present invention, such as a single-layer film and a laminate including the single-layer film, can be preferably used as antifogging materials, antifouling materials, antistatic materials, etc.

By covering, for example, vehicles and vehicle materials, ships and ship materials, airplanes and airplane materials, buildings and building materials, windows, mirrors, outer walls, exterior trim, bodies, wheels, inner walls, interior trim and floors of vehicles, ships, airplanes and buildings, furniture and furniture materials, clothes, fabrics, fibers, bath room materials and kitchen materials, ventilation fans, pipes, wires, electric appliances and their materials, displays and their materials, optical articles, such as optical films, optical discs, spectacles, contact lenses and goggles, illumination articles and their materials, such as lamps and lights, cooling fins of heat exchangers and the like, recording printing materials, such as photoresists and ink-jet recording plates, cosmetic containers and their materials, reflective materials, such as reflective films and reflective plates, noise insulating materials placed on highways and the like, display materials, printing or setting primers, other primers, flat panels, touch panels, sheets, films, tapes, transparent resins, and transparent materials such as glasses, with the hydrophilic cured products, such as single-layer films and laminates, hydrophilicity, antifogging properties and antifouling properties can be imparted. Moreover, dew condensation prevention properties can be imparted, or antistatic properties can be imparted.

EXAMPLES

The present invention is described in more detail with reference to the following examples, but it should be construed that the present invention is in no way limited to those examples. In the present invention, evaluation of film properties was carried out in the following manner.

<Measurement of Water Contact Angle>

Water contact angle was measured at room temperature (25° C.) using CA-V model manufactured by Kyowa Interface Science Co., Ltd.

<Measurement of Haze>

Haze was measured at four positions for one sample using a haze meter NDH2000 manufactured by Nippon Denshoku Industries Co., Ltd., and a mean value was described.

<Scratch Resistance Test>

Using a steel wool #0000, a sample was rubbed by 10 reciprocations under a load of 1 kgf. A case where no scratch was made was evaluated as AA; a case where 1 to 5 scratches were made was evaluated as BB; and a case where 6 scratches to innumerable scratches were made was evaluated as CC.

<Evaluation of Antifogging Properties>

A case where no fog was caused by expiration was evaluated as AA; and a case where fog was caused by expiration was evaluated as BB.

<Evaluation of Antifouling Properties>

A mark was made with an oil-based marker "Mckee Extra Fine" (black, product No. MO-120-MC-BK) manufactured by Zebra Co., Ltd., then a water droplet was let fall thereon and allowed to stand for 30 seconds, followed by wiping with tissue paper. A case where the mark could be wiped out was evaluated as AA; and a case where the mark could not be wiped out and remained was evaluated as BB.

<Evaluation of Adhesion Properties>

Adhesion properties were evaluated by a cross-cut peel test.

<Measurement of Anion and Cation Concentration Ratios>

The anion concentration ratio of an anion concentration at the coating layer surface 40 of a coating layer 20 on a surface of a substrate 10 to that at the coating layer inner part 50 (deep part) was determined in the following manner. A sample was obliquely cut in the cutting direction 30 in accordance with the sample preparation shown in FIG. 1, then an anion concentration was measured at the coating layer surface 40 and at the coating layer inner part 50 (at the position of ½ of the film thickness, inner surface of the coating layer in contact with the substrate 10) that is the inner part of the single-layer film by the use of a time-of-flight secondary ion mass analyzer (TOF-SIMS), and from the values obtained, an anion concentration ratio (Sa/Da) was determined.

Anion concentration ratio (Sa/Da)=anion concentration at the coating layer surface 40/anion concentration at the position of ½ of the film thickness of the coating layer 20

Analyzer and Measuring Conditions in Table 3
  TOF-SIMS: TRIFT2 manufactured by ULVAC-PHI Inc.
  Primary ion: 69Ga+ (acceleration voltage: 15 kV)
  Measuring area: 230 μm square
  An electron gun for charge correction was used in the measurement.

Analyzer and Measuring Conditions in Table 11 and Table 17
  TOF-SIMS: TOF-SIMS5 manufactured by ION-TOF Inc.
  Primary ion: $Bi_3^{2+}$ (acceleration voltage: 25 kV)
  Measuring area: 400 μm$^2$
  A neutralizing gun for charge correction was used in the measurement.

Sample Preparation, Etc.

A sample was obliquely cut in the cutting direction 30 as shown in FIG. 1, then fine oblique cutting of the sample was carried out, and the sample was cut into a size of about 10×10 mm$^2$. To the measuring surface, a mesh was applied, and the resulting sample was fixed into a sample holder, followed by the measurement.

Evaluation

Evaluation was carried out by the following calculation formulas. As the ion concentration at each measuring point, a relative strength (to the total of detected ions) was used.

Anion concentration ratio=anion concentration at the surface/anion concentration at the coating layer inner part (central part of film)

Cation concentration ratio=cation concentration at the surface/cation concentration at the coating layer inner part (central part of film)

Example 1

Preparation of Polymerizable Composition

First, a composition described in the earlier application (WO2007/064003) was prepared. That is to say, 1.5 g of 3-sulfopropyl acrylate potassium salt (abbreviated to SPA-K hereinafter) classified as the mono (meth)acrylate (I), 0.1 g of Nylostab S-EED (manufactured by Clariant Japan Co., Ltd.) as a stabilizer and 25.4 g of methanol were stirred under ultrasonic irradiation to dissolve them. Subsequently, to the solution were added in order 20.0 g of "A-GLY-9E" (trade name, manufactured by Shin-Nakamura Chemical Co. Ltd.) (ethoxylated glycerol triacrylate) classified as the polyvalent monomer (II) and 80.0 g of "A-9530" (trade name, manufactured by Shin-Nakamura Chemical Co., Ltd.) (dipentaerythritol polyacrylate) likewise classified as the polyvalent monomer (II), and they were mixed and stirred to obtain 127.0 g of a polymerizable composition #130 having a solids content NV of 80% by weight. Formulation of the resulting polymerizable composition #130 is set forth in Table 1.

TABLE 1

Formulation of polymerizable composition #130 (solids content: 80%)

| Product name | Amount blended (g) | Concentration (wt %) | Remarks |
| --- | --- | --- | --- |
| SPA-K | 1.5 | 1.2% | mono(meth)acrylate (I) |
| A-GLY-9E | 20.0 | 15.7% | polyvalent monomer (II) |
| A-9530 | 80.0 | 63.0% | polyvalent monomer (II) |
| S-EED | 0.1 | 0.1% | stabilizer |
| Methanol | 25.4 | 20.0% | solvent |
| Total | 127.0 | 100.0% | |

<Addition and Reaction of Compound (IV)>

0.5 g (0.5 wt %/(mono(meth)acrylate (I)+polyvalent monomer (II))) of sodium 3-mercaptopropylsulfonate (abbreviated to MPS-Na hereinafter) that is the compound (IV), 0.05 g of triethylamine as a reaction catalyst, and 9.25 g of 2-methoxyethanol and 0.20 g of water as solvents were mixed and dissolved to obtain a homogeneous solution.

To the polymerizable composition #130, 10.0 g of the resulting MPS-Na solution was added, and they were stirred for not shorter than 1 hour at room temperature and allowed to stand for one day and night to obtain 137.0 g of a homogenous reaction solution 1.

<Preparation of Coating Solution>

To 137.0 g of the resulting reaction solution 1, 6.1 g (3 wt % as Irgacure 127/(compound (I)+compound (II))) of Irgacure 127 (50 wt %-methanol solution) as an UV polymerization initiator and 67.0 g of 2-methoxyethanol as a diluent solvent were added, and they were mixed and dissolved to obtain a coating solution 1 having a solids content NV of 50% by weight.

<Coating of Substrate>

A substrate (manufactured by Takiron Co., Ltd., polycarbonate plate, 100 mm (length)×100 mm (width)×2 mm (thickness)) was coated with the resulting coating solution 1 by means of a bar coater, placed immediately in a hot air dryer at 40 to 50° C. for 2 to 3 minutes to evaporate the solvent and finally passed through an UV conveyer (manufactured by Fusion UV Systems Japan K. K., electrodeless discharge lamp H valve, conveyer rate: 6 m/min, integrated light quantity: 900 mJ/cm²) to form a tack-free transparent film on the substrate surface.

Evaluation of the resulting film was carried out after the surface of the film was lightly washed with running water and the adhesive moisture was removed by an air gun for the purpose of removing influence of dust, etc. having adhered. The results are set forth in Table 2. A relative ionic strength ratio (distribution of anion and cation concentrations) of the cut surface of the film measured by TOF-SIMS is set forth in Table 3.

Comparative Example 1

Tests were carried out in the same manner as in Example 1, except that MPS-Na that is the compound (IV) was not added.

The results are set forth in Table 2, and a relative ionic strength ratio (distribution of anion and cation concentrations) of the cut surface of the film measured by TOF-SIMS is set forth in Table 3.

TABLE 2

| | | | | Evaluation of coating film | | | | |
|---|---|---|---|---|---|---|---|---|
| No. | Compound (IV) Structure | *Amount added (wt %) | Film thickness (μm) | Appearance | Water contact angle (°) | Haze (%) | **Scratch resistance | Remarks |
| Ex. 1-1 | 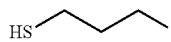 | 0.5% | 1.5 | transparent | 4 | 0.2 | BB | |
| Ex. 1-2 | 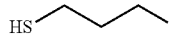 | 0.5% | 5 | transparent | 4 | 0.2 | AA | |
| Ex. 1-3 | 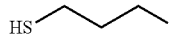 | 0.5% | 11 | transparent | 4 | 0.5 | AA | |
| Ex. 1-4 |  | 0.5% | 21 | transparent | 4 | 0.5 | AA | |
| Comp. Ex. 1-1 | none | 0.0% | 1.5 | slightly whitened | 7 | 1.5 | CC | |
| Comp. Ex. 1-2 | none | 0.0% | 5 | transparent | 4 | 0.5 | AA | |
| Comp. Ex. 1-3 | none | 0.0% | 11 | transparent | 4 | 0.6 | AA | film cracking |
| Comp. Ex. 1-4 | none | 0.0% | 21 | transparent | 4 | 0.6 | AA | film cracking |

*compound (IV)/{compound (1) + compound (2)}*100

**steel wool #0000 × load of 1 kg × 10 reciprocations

Evaluation:

AA: no scratch, BB: not more than 5 scratches, CC: 6 scratches to innumerable scratches

TABLE 3

| Comparison of degree of inclination (based on relative ionic strength) | | | | | | |
|---|---|---|---|---|---|---|
| | | Surface | Upper part of film (surface side) | Center of film | Lower part of film (substrate side) | Concentration ratio | remarks |
| Ex. 1-2 | $SO_3^-$ | 8.6E−02 | 3.2E−02 | 3.4E−02 | 3.7E−02 | 2.5 | degree of inclination |
| | $K^+$ | 9.5E−01 | 1.7E−01 | 1.8E−01 | 2.0E−01 | 5.3 | |
| | $Na^+$ | 1.2E−01 | 3.5E−02 | 3.5E−02 | 3.7E−02 | 3.4 | |
| Comp. Ex. 1-2 | $SO_3^-$ | 7.6E−02 | 2.8E−02 | 3.1E−02 | 3.3E−02 | 2.5 | degree of inclination |
| | $K^+$ | 1.3E+00 | 1.6E−01 | 1.7E−01 | 1.9E−01 | 7.6 | |
| | $Na^+$ | <2E−02 | <2E−02 | <2E−02 | <2E−02 | — | |

Examples 2 and 3

Tests were carried out in the same manner as in Example 1, except that the amount of MPS-Na that is the compound (IV) was changed. The results are set forth in Table 4.

<Taber Abrasion Test>
Measuring equipment: rotary abrasion tester, manufactured by Toyo Seiki Seisaku-sho, Ltd.
Truck wheel: CS-10F
Load: 500 g (250 g+250 g)×2

TABLE 4

| No. | Compound (IV) Structure | **Amount added (wt %) | Film thickness (μm) | Appearance | Water contact angle (°) | Haze (%) | ***Scratch resistance | Remarks |
|---|---|---|---|---|---|---|---|---|
| Ex. 1 | HS–CH2CH2CH2–SO3Na | 0.5% | 5 | transparent | 4 | 0.2 | AA | Ex. 1-2 |
| Ex. 2 | HS–CH2CH2CH2–SO3Na | 1.8% | 5 | transparent | 4 | 0.4 | AA | |
| Ex. 3 | HS–CH2CH2CH2–SO3Na | 3.0% | 5 | transparent | 4 | 0.5 | AA | |

**compound (IV)/{compound (I) + compound (II)}*100
***steel wool #0000 × load of 1 kg × 10 reciprocations
Evaluation: AA: no scratch, BB: not more than 5 scratches, CC: 6 scratches to innumerable scratches

Example 4

A substrate (manufactured by Takiron Co., Ltd., polycarbonate plate, 100 mm (length)×100 mm (width)×2 mm (thickness)) was coated with the coating solution 1 prepared in Example 1 by means of a bar coater so that the resulting cured film might have a thickness described in the following Table 5, and it was dried in a hot air dryer at 40 to 50° C. for 2 to 3 minutes. Immediately after the drying, the substrate was passed through an UV conveyer (manufactured by Fusion UV Systems Japan K.K., electrodeless discharge lamp H valve, conveyer rate: 18 m/min, (integration 300 mJ/cm$^2$)×3 times) to form a transparent film on the substrate surface. The resulting transparent film was subjected to Taber abrasion test under the following conditions, and after the test, haze was measured. The results are set forth in Table 5.

Comparative Example 2

A film was prepared in the same manner as in Example 4, except that MPA-Na that is the compound (IV) was not added. The resulting film was subjected to Taber abrasion test, and after the test, haze was measured. The results are set forth in Table 5.

TABLE 5

| No. | *MPS-Na Amount added (wt %) | Film thickness (μm) | Appearance | Water contact angle (°) | Taber abrasion test Haze (%) | | | | |
|---|---|---|---|---|---|---|---|---|---|
| | | | | | 0 rotation | 50 rotations | 100 rotations | 250 rotations | 500 rotations |
| Ex. 4-1 | 0.5 | 3 | transparent | 4 | 0.9 | 2.0 | 3.4 | 6.8 | 12.9 |
| Ex. 4-2 | 0.5 | 5 | transparent | 4 | 0.7 | 2.3 | 4.5 | 10.4 | 22.0 |
| Ex. 4-3 | 0.5 | 8 | transparent | 4 | 0.4 | 3.5 | 7.8 | 21.4 | 38.2 |
| Comp. Ex. 2-1 | none | 3 | transparent | 4 | 1.0 | 13.6 | 28.2 | 54.0 | 55.3 |
| Comp. Ex. 2-2 | none | 5 | transparent | 4 | 0.8 | 5.3 | 11.2 | 34.5 | 58.6 |
| Comp. Ex. 2-3 | none | 8 | transparent | 4 | 1.2 | 6.5 | 14.2 | 44.1 | 64.5 |

*[compound (IV) MPS-Na/[compound (I) + compound (II)]]*100

Examples 5 to 15

Preparation of Polymerizable Composition

A polymerizable composition 1 having a solids content of 80% by weight was prepared in accordance with blending of the following Table 6.

TABLE 6

| | | Polymerizable composition 1 | | | |
|---|---|---|---|---|---|
| Product name | Molecular weight | Amount blended (g) | Amount blended (mmol) | Concentration (wt %) | Remarks |
| SPA-K | 232.30 | 1.80 | 7.7 | 1.41 | mono(meth)acrylate (I) |
| P-2M | 322.25 | 0.45 | 1.4 | 0.35 | mono(meth)acrylate (I) |
| A-GLY-9E | 650.71 | 30.00 | 46.1 | 23.45 | polyvalent monomer (II) |
| A9300-1CL | 537.20 | 5.00 | 9.3 | 3.91 | polyvalent monomer (II) |
| U-15HA | 2078.12 | 65.00 | 31.3 | 50.81 | polyvalent monomer (II) |
| S-EED | | 0.10 | | 0.08 | stabilizer |
| Methanol | | 25.59 | | 20.00 | solvent |
| Total | | 127.9 | | 100.00 | |
| Solids content (%) = | | | | 80.00 | |

Polyvalent monomer (II)/mono(meth)acrylate (I) molar ratio = 9.5

<Addition and Reaction of Compound (IV)>

To 0.05 g (compound (IV)/(mono(meth)acrylate (I)+polyvalent monomer (II))=0.5 wt %) of the compound (IV) described in the following Table 7, 11.5 g of 2-methoxyethanol and 1.0 g of water as solvents, and 0.03 g of triethylamine as a reaction catalyst were added, and they were mixed and dissolved to obtain 12.58 g of a homogeneous solution.

The resulting solution containing the compound (IV) was added to 12.5 g of the polymerizable composition 1, and they were mixed and allowed to stand for 1 hour to obtain 25.08 g of a homogeneous reaction solution 2 having a solids content of 40% by weight.

<Preparation of Coating Solution>

To 25.08 g of the resulting reaction solution 2, 0.6 g (3 wt %/solids content of reaction solution 2) of 50 wt %-Irgacure 127 (methanol solution) was added, and they were mixed to obtain a coating solution 2 having a solids content NV of 40% by weight.

<Coating of Substrate>

A PC plate (manufactured by Takiron Co., Ltd., polycarbonate plate, 100 mm (length)×100 mm (width)×2 mm (thickness)) was coated with the resulting coating solution 2 by means of a bar coater #10, placed immediately in a hot air dryer at 40 to 50° C. for 2 to 3 minutes to evaporate the solvent and finally passed through an UV conveyer (manufactured by Fusion UV Systems Japan K. K., electrodeless discharge lamp H valve, conveyer rate: 18 m/min, 300 mJ/cm$^2$) three times (integrated light quantity: 900 mJ/cm$^2$) to form a coating film having a film thickness of about 5 μm on the substrate surface.

Evaluation of the resulting coating film was carried out after the surface of the film was lightly washed with running water and the adhesive moisture was removed by an air gun for the purpose of removing influence of dust, etc. having adhered. The results are set forth in Table 7.

TABLE 7

| No. | Compound (IV) | Appearance | Water contact angle (°) | Haze (%) | Tack |
|---|---|---|---|---|---|
| Ex. 5 | 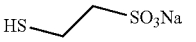 | transparent | 6 | 0.2 | none |
| Ex. 6 |  | transparent | 7 | 0.2 | none |
| Ex. 7 | 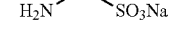 | transparent | 5 | 0.5 | none |
| Ex. 8 | 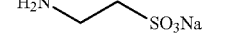 | slightly whitened | 8 | 2.0 | none |
| Ex. 9 | 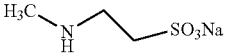 | slightly whitened | 4 | 1.7 | none |
| Ex. 10 | 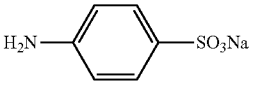 | transparent | 6 | 0.4 | none |
| Ex. 11 | 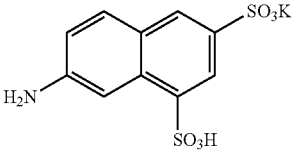 | transparent | 10 | 0.3 | none |

TABLE 7-continued

| No. | Compound (IV) | Appearance | Water contact angle (°) | Haze (%) | Tack |
|---|---|---|---|---|---|
| Ex. 12 | 4-amino-5-hydroxy... naphthalene with NH₂, SO₃Na, NaO₃S, SO₃Na substituents | transparent | 3 | 0.5 | none |
| Ex. 13 | HO—C₆H₄—SO₃Na | transparent | 6 | 0.3 | none |
| Ex. 14 | H₂N—C₆H₃(CH₃)—SO₃Na | transparent | 7 | 0.5 | none |
| Ex. 15 | 1-amino-4-bromo-2-sulfo anthraquinone sodium salt (NH₂, SO₃Na, Br, O substituents) | transparent | 6 | 0.6 | none |

Example 16

Preparation of Reaction Solution of Compound (IV)

Components were mixed and dissolved in accordance with blending of the following Table 8, and thereafter, the resulting solution was allowed to stand at room temperature for not shorter than 1 hour to react the compound (IV), whereby a reaction solution 3 having a solids content of 33% by weight was prepared.

TABLE 8

Reaction solution 3

| Product name | Molecular weight | Amount blended (g) | Amount blended (mmol) | Concentration (wt %) | |
|---|---|---|---|---|---|
| MPS-Na | 178.2 | 2.40 | 13.47 | 1.0% | compound (IV) |
| SPA-K | 232.3 | 0.33 | 1.41 | 0.1% | mono(meth)acrylate (I) |
| PE3A | 298.3 | 80.00 | 268.20 | 32.0% | polyvalent monomer (II) |
| Triethylamine | | 0.33 | | 0.1% | reaction catalyst |
| Water | | 15.15 | | 6.1% | solvent |
| Methoxyethanol | | 151.53 | | 60.6% | solvent |
| S-EED | 442.6 | 0.20 | 0.45 | 0.1% | stabilizer |
| | | 249.9 | 283.53 | 100.0% | |
| | | Solids content (wt %) = | | 33% | |

Polyvalent monomer (II)/mono(meth)acrylate (I) molar ratio = 190

Compound (IV)/polyvalent monomer (II) weight ratio = 0.03

TABLE 8-continued eaction solution 3

| Product name | Molecular weight | Amount blended (g) | Amount blended (mmol) | Concentration (wt %) |
|---|---|---|---|---|

[Chem. 14]

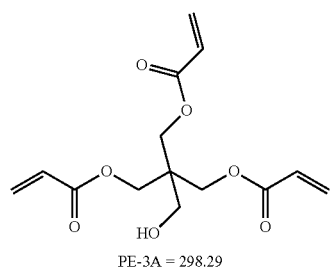 [SMILES: C=CC(=O)OCC(CO)(COC(=O)C=C)COC(=O)C=C]

PE-3A = 298.29

<Preparation of Coating Solution>

To 30.3 g of the reaction solution 3, 0.6 g of 50 wt %-Irgacure 127 (methanol solution) was added as a polymerization initiator, and they were mixed and dissolved to obtain a coating solution 3 having a solids content of 33% by weight.

<Coating of Substrate>

A PC plate (manufactured by Takiron Co., Ltd., polycarbonate plate, 100 mm (length)×100 mm (width)×2 mm (thickness)) was coated with the resulting coating solution 3 by means of a bar coater #14 and dried in a hot air dryer at 80° C. for 10 minutes. Immediately after the drying, the substrate was passed through an UV conveyer (manufactured by Fusion UV Systems Japan K. K., electrodeless discharge lamp H valve, conveyer rate: 18 m/min, 300 mJ/cm$^2$) three times (integrated light quantity: 900 mJ/cm$^2$) to form a coating film having a film thickness of about 6 μm on the substrate surface.

Evaluation of the resulting coating film was carried out after washing with running water and removal of the adhesive moisture by an air gun were performed. The results are set forth in Table 9.

TABLE 9

*Evaluation of high-molar ratio coating film

| Evaluation items | Evaluation results |
|---|---|
| Appearance | transparent |
| Water contact angle (°) | 3 |
| Haze (%) | 0.4 |
| Scratch resistance | AA |
| Adhesion properties | 100/100 |
| Antifogging properties | AA |
| Antifouling properties | AA |

*Polyvalent monomer (II)/mono(meth)acrylate (I) molar ratio = 190 Compound (IV)/polyvalent monomer (II) weight ratio = 0.03

Example 17

Preparation of Reaction Solution of Compound (IV)

Components were mixed and dissolved in accordance with blending of the following Table 10, and thereafter, the resulting solution was allowed to stand at room temperature for not shorter than 1 hour to react the compound (IV), whereby a reaction solution 4 having a solids content of 80% by weight was prepared.

TABLE 10

Reaction solution 4

| Product name | Molecular weight | Amount blended (g) | Amount blended (mmol) | Concentration (wt %) | Remarks |
|---|---|---|---|---|---|
| MPS-Na | 178.2 | 0.5 | 2.81 | 0.40% | compound (IV) |
| SPA-K | 232.3 | 1.5 | 6.46 | 1.20% | mono(meth)acrylate (I) |
| A-GLY-9E | 650.7 | 20.0 | 30.74 | 15.70% | polyvalent monomer (II) |
| A-9530 | 524.5 | 80.0 | 152.52 | 62.60% | polyvalent monomer (II) |
| S-EED | | 0.1 | | 0.10% | stabilizer |
| Triethylamine | | 0.2 | | 0.20% | reaction catalyst |

TABLE 10-continued

| | | Reaction solution 4 | | | |
|---|---|---|---|---|---|
| Product name | Molecular weight | Amount blended (g) | Amount blended (mmol) | Concentration (wt %) | Remarks |
| Water | | 2.0 | | 1.60% | solvent |
| Methanol | | 23.4 | | 18.30% | solvent |
| Total | | 127.7 | | 100.00% | |
| | | Solids content (wt %) = | | 80% | |

Polyvalent monomer (II)/mono(meth)acrylate (I) molar ratio = 28.4
Compound (IV)/polyvalent monomer (II) weight ratio = 0.005

<Preparation of Coating Solution>

To 12.5 g of the reaction solution 4, 0.6 g of 50 wt %-Irgacure 127 (methanol solution) was added as a polymerization initiator, and they were mixed and dissolved. Thereafter, to the resulting solution was added 4.3 g of each diluent solvent described in the following Table 11, and they were mixed and dissolved to obtain plural coating solutions (solids content: 60% by weight).

<Coating of Substrate>

A PC plate (manufactured by Takiron Co., Ltd., polycarbonate plate, 100 mm (length)×100 mm (width)×2 mm (thickness)) was coated with the resulting coating solution by means of a bar coater #24 and dried in a hot air dryer at 60 to 65° C. for 2 minutes. Immediately after the drying, the substrate was passed through an UV conveyer (manufactured by Fusion UV Systems Japan K. K., electrodeless discharge lamp H valve, conveyer rate: 18 m/min, 300 mJ/cm$^2$) three times (integrated light quantity: 900 mJ/cm$^2$) to form a coating film having a film thickness of about 20 μm on the substrate surface.

The column of Methanol in Table 11 means that a PC plate was coated with a solution (solids content: 80% by weight), which had been obtained by adding 0.6 g of 50 wt %-Irgacure 127 (methanol solution) as a polymerization initiator to the reaction solution 4 and performing mixing and dissolving, by means of a bar coater #18, then dried and thereafter passed through an UV conveyer under the above conditions to form a film on the substrate surface.

Evaluation of the resulting coating films was carried out after washing with running water and removal of the adhesive moisture by an air gun were performed. The results are set forth in Table 11.

TABLE 11

Variation of coating film due to change of diluent solvent (change of SP value)

| Diluent solvent *Solubility parameter σ (cal/cm$^3$) | Methanol 13.1 | Acetonitrile 12.0 | 2-Methoxy-ethanol 10.8 | Isopropanol 10.0 | 1-Methoxy-2-propanol 9.6 |
|---|---|---|---|---|---|
| Film thickness (μm) | 20 | 20 | 20 | 20 | 20 |
| Appearance | transparent | transparent | transparent | transparent | transparent |
| Water contact angle (°) | 4 | 3 | 5 | 8 | 7 |
| Haze (%) | 0.5 | 0.4 | 0.6 | 0.6 | 0.9 |
| Antifogging properties | AA | AA | AA | AA | AA |
| Antifouling properties | AA | AA | AA | AA | AA |
| Surface tack | none | none | none | none | none |
| Anion concentration ratio (Sa/Da) not less than 1.1 | Yes | Yes | Yes | Yes | Yes |

| Diluent solvent *Solubility parameter σ (cal/cm$^3$) | 1-Pentanol 9.5 | Toluene 9.0 | 2-Pentanone 8.9 | Butyl acetate 8.4 |
|---|---|---|---|---|
| Film thickness (μm) | 20 | 20 | 20 | 20 |
| Appearance | slightly whitened | transparent | transparent | transparent |
| Water contact angle (°) | 10 | 57 | 55 | 60 |
| Haze (%) | 2.1 | 1.0 | 1.5 | 0.8 |
| Antifogging properties | AA | BB | BB | BB |
| Antifouling properties | AA | BB | BB | BB |
| Surface tack | none | none | none | none |
| Anion concentration ratio (Sa/Da) not less than 1.1 | Yes | No | No | No |

*Calculated value

Examples 18 to 21

Preparation of Polymerizable Composition

A polymerizabel composition 2 having a solids content of 80% by weight was prepared in accordance with blending of the following Table 12.

TABLE 12

| Polymerizable composition 2 | | | |
| --- | --- | --- | --- |
| Product name | Amount blended (g) | Concentration (wt %) | Remarks |
| A9300-1CL | 5.00 | 3.91 | polyvalent monomer (II) |
| U-15HA | 65.00 | 50.81 | polyvalent monomer (II) |
| Methanol | 25.59 | 20.00 | solvent |
| Total | 127.9 | 100.00 | |
| Solids content (%) = | 80.0 | | |

[Chem. 15]

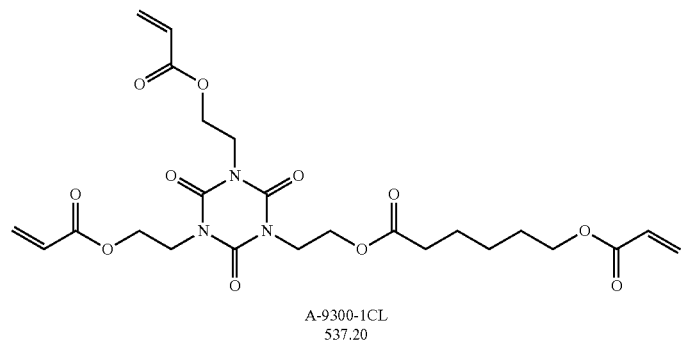

A-9300-1CL
537.20

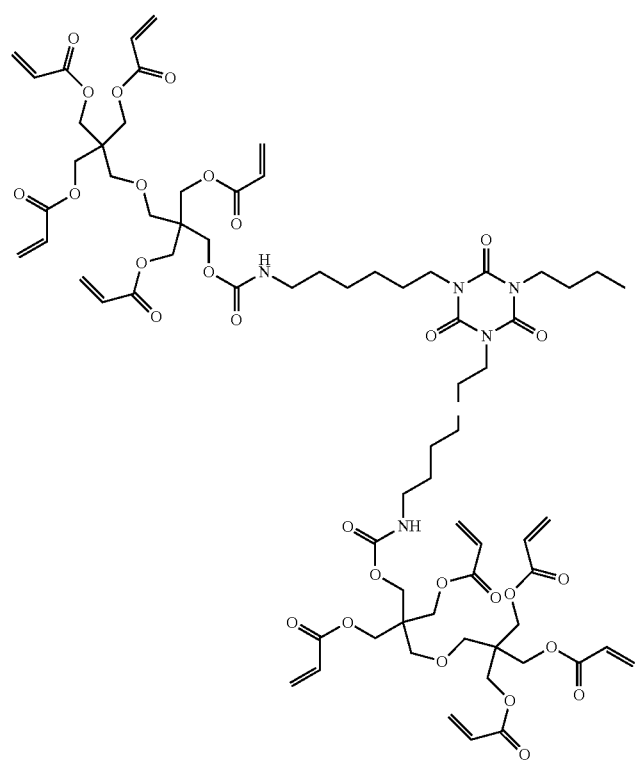

TABLE 12-continued

Polymerizable composition 2

| Product name | Amount blended (g) | Concentration (wt %) | Remarks |
|---|---|---|---|

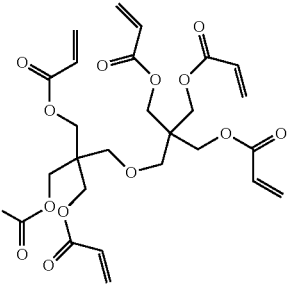

U-15HA
2078.12

<Preparation of Solution Containing Compound (IV)>

A solution containing the compound (IV) was prepared in accordance with blending of the following Table 13.

TABLE 13

Composition containing compound (IV)

| Product name | Amount blended (g) | Concentration (wt %) | Remarks |
|---|---|---|---|
| MPS-Na | 50.0 | 5.0 | compound (IV) |
| Triethylamine | 5.0 | 0.5 | reaction catalyst |
| 2-Methoxyethanol | 865.0 | 86.5 | solvent |
| Water | 80.0 | 8.0 | solvent |
| Total | 1000.0 | 100.0 | |
| Solids content (%) = | 5.0 | | |

<Preparation of Coating Solution>

The resulting polymerizable composition 2 and the resulting solution containing the compound (IV) were mixed and dissolved so that a blending ratio shown in Table 14 might be obtained, and the mixed solution was allowed to stand at room temperature for 1 hour. To the resulting mixed solution, 50 wt %-Irgacure 127 (methanol solution) was added in an amount of 0.6% by weight based on the solids content of the mixed solution, and they were further mixed to obtain a homogeneous coating solution.

<Coating of Substrate>

A PC plate (manufactured by Takiron Co., Ltd., polycarbonate plate, 100 mm (length)×100 mm (width)×2 mm (thickness)) was coated with the resulting coating solution by means of a bar coater so that the film thickness after drying might become 5 μm, and it was dried in a hot air dryer at 45 to 50° C. for 2 minutes. Immediately after the drying, the substrate was passed through an UV conveyer (manufactured by Fusion UV Systems Japan K. K., electrodeless discharge lamp H valve, conveyer rate: 18 m/min, 300 mJ/cm$^2$) three times (integrated light quantity: 900 mJ/cm$^2$) to form a coating film having a film thickness of about 5 μm on the substrate surface.

Evaluation of the resulting coating film was carried out after washing with running water was performed. The results are set forth in Table 14.

Comparative Example 3

A coating film was prepared in the same manner as in Example 18, except that MPS-Na that is the compound (IV) was not added. Then, evaluation was carried out. The results are set forth in Table 14.

татаBLE 14

| No. | Compound (IV) | polyvalent monomer (II)-1 | polyvalent monomer (II)-2 | Appearance | Water contact angle (°) | Haze (%) | Scratch resistance | Adhesion properties |
|---|---|---|---|---|---|---|---|---|
| Ex. 18 | MPS-Na 20 g | A-GLY-9E 20 g | A-9530 80 g | transparent | 21 | 0.2 | AA | 100/100 |
| Ex. 19 | MPS-Na 10 g | A-GLY-9E 20 g | A-9530 80 g | transparent | 36 | 0.2 | — | — |
| Ex. 20 | MPS-Na 6 g | A-GLY-9E 20 g | A-9530 80 g | transparent | 36 | 0.1 | — | — |
| Ex. 21 | MPS-Na 3 g | A-GLY-9E 20 g | A-9530 80 g | transparent | 42 | 0.1 | — | — |
| Comp. Ex. 3 | MPS-Na 0 g | A-GLY-9E 20 g | A-9530 80 g | transparent | 47 | 0.1 | — | — |

Examples 22 to 24

Preparation of Coating Solution

The solution containing the compound (IV) and described in Table 13 and 2,6,10-trihydroxy-4,8-dioxaundecane-1,11-diacrylate (abbreviated to 80-MFA hereinafter) were mixed and dissolved so that a blending ratio shown in Table 15 might be obtained, and the mixed solution was allowed to stand at room temperature for 1 hour. To the resulting mixed solution, 50 wt %-Irgacure 127 (methanol solution) was added in an amount of 0.6% by weight based on the solids content of the mixed solution, and they were further mixed to obtain a homogeneous coating solution.

<Coating of Substrate>

An easily adherable PET film (manufactured by Toray Industries, Inc., Lumiler 100-U34, 100 μm) was coated with the resulting coating solution by means of a bar coater so that the film thickness after drying might become 5 μm, and it was dried in a hot air dryer at 45 to 50° C. for 2 minutes. Immediately after the drying, the substrate was passed through an UV conveyer (manufactured by Fusion UV Systems Japan K.K., electrodeless discharge lamp H valve, conveyer rate: 18 m/min, 300 mJ/cm$^2$) three times (integrated light quantity: 900 mJ/cm$^2$) to form a coating film having a film thickness of about 5 μm on the substrate surface.

Evaluation of the resulting coating film was carried out after washing with running water was performed. The results are set forth in Table 15.

Example 25

A coating solution was prepared in the same manner as in Example 24, except that instead of 80-MFA, ethoxylated glycerol triacrylate (A-GLY-9E manufactured by Shin-Nakamura Chemical Co., Ltd.) was mixed and dissolved so that a blending ratio shown in Table 15 might be obtained. Then, coating of a substrate, formation of a coating film on the substrate surface and evaluation of the coating film were carried out. The results are set forth in Table 15.

Example 26

A coating solution was prepared in the same manner as in Example 24, except that instead of 80-MFA, 2,9-dihydroxy-6-methyl-4,7-dioxadecane-1,10-diacrylate (70-PA) and pentaerythritol triacrylate (PE-3A) were mixed and dissolved so that a blending ratio shown in Table 15 might be obtained.

Then, coating of a substrate, formation of a coating film on the substrate surface and evaluation of the coating film were carried out. The results are set forth in Table 15. With regard to this coating film, further, evaluation of antifogging properties and antifouling properties was carried out. The results are set forth in Table 16. With regard to this coating film, furthermore, a relative ionic strength ratio (distribution of anion and cation concentrations) of the cut surface of the coating film was measured by means of TOF-SIMS. The results are set forth in Table 17.

Comparative Example 4

A coating solution was prepared in the same manner as in Example 24, except that instead of the solution containing the compound (IV), 2-methoxyethanol was used in the same amount. Then, coating of a substrate, formation of a coating film on the substrate surface and evaluation of the coating film were carried out. The results are set forth in Table 15.

Comparative Example 5

A coating solution was prepared in the same manner as in Example 25, except that instead of the solution containing the compound (IV), 2-methoxyethanol was used in the same amount. Then, coating of a substrate, formation of a coating film on the substrate surface and evaluation of the coating film were carried out. The results are set forth in Table 15.

Comparative Example 6

A coating solution was prepared in the same manner as in Example 26, except that instead of the solution containing the compound (IV), 2-methoxyethanol was used in the same amount. Then, coating of a substrate, formation of a coating film on the substrate surface and evaluation of the coating film were carried out. The results are set forth in Table 15. With regard to this coating film, further, evaluation of antifogging properties and antifouling properties was carried out. The results are set forth in Table 16.

TABLE 15

| No. | Compound (IV) | polyvalent monomer (II)-1 | polyvalent monomer (II)-2 | Appearance | Water contact angle (°) | Haze (%) | Remarks |
|---|---|---|---|---|---|---|---|
| Ex. 22 | MPS-Na 80 g | 80-MFA 100 g | — | transparent | 6 | 0.7 | partial washing with water |
| Ex. 23 | MPS-Na 60 g | 80-MFA 100 g | — | transparent | 14 | 0.8 | film peeling |
| Ex. 24 | MPS-Na 40 g | 80-MFA 100 g | — | transparent | 14 | 0.5 | |
| Comp. Ex. 4 | none | 80-MFA 100 g | — | transparent | 50 | 0.3 | |
| Ex. 25 | MPS-Na 40 g | A-GLY-9E 100 g | — | transparent | 24 | 0.3 | |
| Comp. Ex. 5 | none | A-GLY-9E 100 g | — | transparent | 39 | 0.4 | |
| Ex. 26 | MPS-Na 40 g | 70-PA 75 g | PE-3A 25 g | transparent | 16 | 0.3 | |
| Comp. Ex. 6 | none | 70-PA 75 g | PE-3A 25 g | transparent | 53 | 0.3 | |

[Chem. 16]

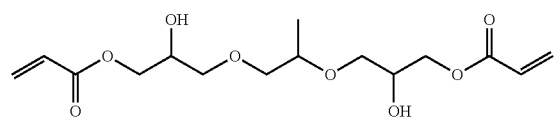

70-PA = 332.35

TABLE 15-continued

| No. | Compound (IV) | polyvalent monomer (II)-1 | polyvalent monomer (II)-2 | Appearance | Water contact angle (°) | Haze (%) | Remarks |
|---|---|---|---|---|---|---|---|

PE-3A = 298.29

TABLE 16

Evaluation of antifogging properties and antifouling properties

| | Ex. 26 | Comp. Ex. 6 |
|---|---|---|
| Antifogging properties | AA | BB |
| Antifouling properties | AA | BB |

TABLE 17

Degree of inclination (based on relative ionic strength)

| | | Surface | Center of film | Lower part of film (substrate side) | Concentration ratio | Remarks |
|---|---|---|---|---|---|---|
| Ex. 26 | $SO_3^-$ | 1.54E−01 | 1.37E−01 | 1.37E−01 | 1.12 | degree of inclination |
| | $Na^+$ | 4.33E−01 | 3.67E−01 | 3.67E−01 | 1.17 | |

Examples 27 and 28

Preparation of Coating Solution

The solution containing the compound (IV) and described in Table 13 and the compound described in Table 18 were mixed and dissolved so that a blending ratio shown in Table 18 might be obtained, and the mixed solution was allowed to stand at room temperature for 1 hour. To the resulting mixed solution, 50 wt %-Irgacure 127 (methanol solution) was added in an amount of 0.6% by weight based on the solids content of the mixed solution, and they were further mixed to obtain a homogeneous coating solution.

<Coating of Substrate>

An acrylic film (manufactured by Mitsubishi Rayon Co., Ltd., Acryprene HBL-002, 75 μm) was coated with the resulting coating solution by means of a bar coater so that the film thickness after drying might become 5 μm, and it was dried in a hot air dryer at 45 to 50° C. for 2 minutes. Immediately after the drying, the substrate was passed through an UV conveyer (manufactured by Fusion UV Systems Japan K.K., electrodeless discharge lamp H valve, conveyer rate: 18 m/min, 300 mJ/cm²) three times (integrated light quantity: 900 mJ/cm²) to form a coating film having a film thickness of about 5 μm on the substrate surface.

Evaluation of the resulting coating film was carried out after washing with running water was performed. The results are set forth in Table 18.

Comparative Examples 7 and 8

Coating solutions were prepared in the same manner as in Examples 27 and 28, respectively, except that instead of the solution containing the compound (IV), 2-methoxyethanol was used in the same amount. Then, coating of a substrate, formation of a coating film on the substrate surface and evaluation of the coating film were carried out. The results are set forth in Table 18.

TABLE 18

| No. | Compound (IV) | Polyvalent monomer (II) | Appearance | Water contact angle (°) | Haze (%) |
|---|---|---|---|---|---|
| Ex. 27 | MPS-Na 60 g | EA-5720 100 g | transparent | 39 | 0.6 |
| Comp. Ex. 7 | none | EA-5720 100 g | transparent | 71 | 0.4 |
| Ex. 28 | MPS-Na 40 g | EA-5721 100 g | transparent | 36 | 0.4 |
| Comp. Ex. 8 | none | EA-5721 100 g | transparent | 78 | 0.4 |

TABLE 18-continued

| No. | Compound (IV) | Polyvalent monomer (II) | Appearance | Water contact angle (°) | Haze (%) |
|---|---|---|---|---|---|

[Chem. 17]

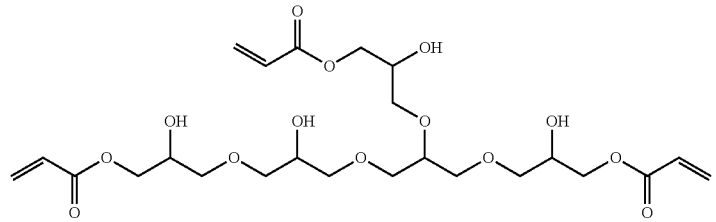

EA-5720 = 550.55

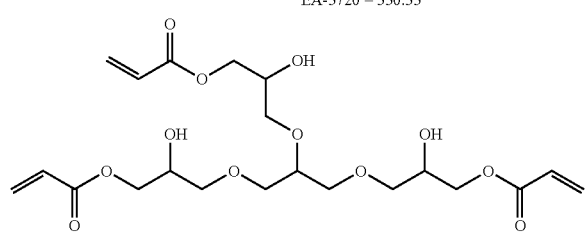

EA-5721 = 476.47

Examples 29 to 33

Preparation of Coating Solution

A homogeneous coating solution containing the polyvalent monomer (II) described in Table 20 was prepared in accordance with a blending ratio described in Table 19.

TABLE 19

Preparation of coating solution

| Product name | Blending (g) | Blending (wt %) | Remarks |
|---|---|---|---|
| Composition of Table 13 (5 wt %) | 20.00 | 52.9% | compound (IV) |
| 80-MFA | 9.00 | 23.8% | polyvalent monomer (II) |
| Polyvalent monomer | 1.00 | 2.6% | polyvalent monomer (II) |
| *40%-Irgacure 127 | 0.80 | 2.1% | polymerization initiator |
| 2-Methoxyethanol | 7.00 | 18.5% | solvent |
| Total | 37.80 | 100.0% | |
| *2-Methoxyethanol solution | | | |
| Solids content (wt %) = | | 29.9% | |
| Compound (IV)/compound (II) weight ratio = | | 10.0% | |

[Chem. 18]

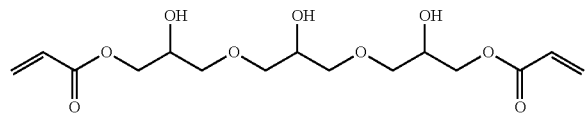

80-MFA = 348.35

<Coating of Substrate>

A PC plate (manufactured by Takiron Co., Ltd., polycarbonate plate, 100 mm (length)×100 mm (width)×2 mm (thickness)) was coated with the resulting coating solution by means of a bar coater #12 and dried in a hot air dryer at 80 to 85° C. for 3 minutes. Immediately after the drying, the substrate was passed through an UV conveyer (manufactured by Fusion UV Systems Japan K.K., electrodeless discharge lamp H valve, conveyer rate: 18 m/min, 300 mJ/cm$^2$) three times (integrated light quantity: 900 mJ/cm$^2$) to form a coating film having a film thickness of about 5 μm on the substrate surface. The results are set forth in Table 20.

TABLE 20

| | Polyvalent monomer (II) | Appearance | Water contact angle (°) | Haze (%) |
|---|---|---|---|---|
| Ex. 29 | APG-200 | transparent | 17 | 0.9 |
| Ex. 30 | HX-220 | transparent | 9 | 0.2 |

TABLE 20-continued

| | Polyvalent monomer (II) | Appearance | Water contact angle (°) | Haze (%) |
|---|---|---|---|---|
| Ex. 31 | HX-620 | transparent | 11 | 0.3 |
| Ex. 32 | 23G | transparent | 38 | 0.1 |
| Ex. 33 | DPCA-30 | transparent | 39 | 0.3 |

[Chem. 19]

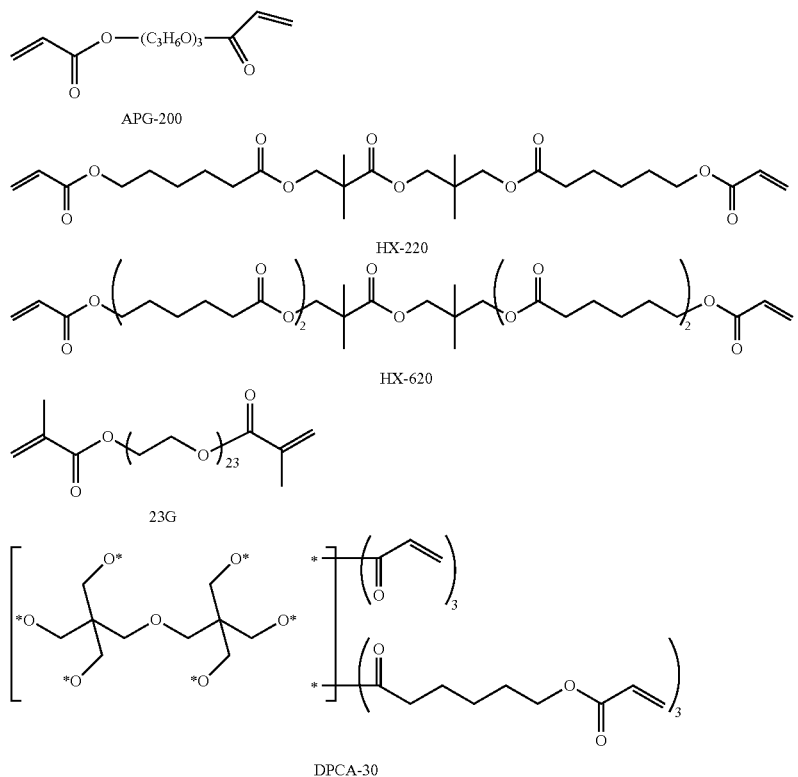

*represents a bonding hand

REFERENCE SIGNS LIST

10: substrate, 20: coating layer, 30: cutting direction, 40: coating layer surface, 50: coating layer inner part

The invention claimed is:

1. A hydrophilic cured product obtained by polymerizing a mixture containing:
   a polyvalent monomer (II) having two or more (meth)acryloyl groups, and
   a compound (IV), wherein the compound (IV) contained in the mixture is at least one compound selected from a group of compounds represented by the following general formulas (100), (200) and (300):

[Chem. 1]

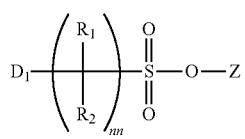

(100)

wherein $D_1$ is a mercapto group, an amino group, a methylamino group or an ethylamino group, Z is a hydrogen ion, an ammonium ion, an amine ion, an alkaline metal ion or ½ equivalent of an alkaline earth metal ion, $R_1$ and $R_2$ are each independently H, a methyl group, an ethyl group, a methoxy group or an ethoxy group, and nn is an integer of 1 to 10,

[Chem. 2]

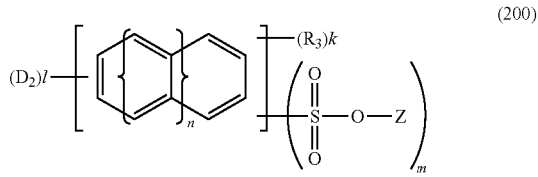

(200)

wherein $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or ½ equivalent of an alkaline earth metal ion, each $R_3$ is independently H, a methyl group, an ethyl group, a methoxy group, an ethoxy group, a fluorine atom, a chlorine atom, a bromine atom or an iodine atom, k is an integer of 0 to 10, l and m are each independently an integer of 1 to 11, k, l and m are numbers satisfying the condition of k+l+m=2 to 6+2n, and n is an integer of 0 to 3,

[Chem. 3]

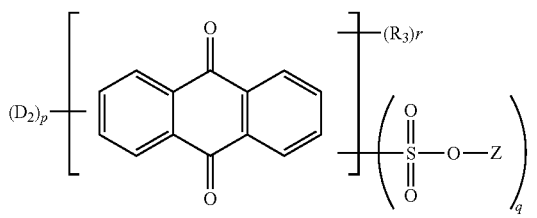

(300)

wherein $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or ½ equivalent of an alkaline earth metal ion, each $R_3$ is independently H, a methyl group, an ethyl group, a methoxy group, an ethoxy group, a fluorine atom, a chlorine atom, a bromine atom or an iodine atom, r is an integer of 0 to 6, q and p are each independently an integer of 1 to 7, and p, q and r are numbers satisfying the condition of p+q+r=an integer of 2 to 8, and the amount of the compound (IV) added based on 100 parts by weight of the polyvalent monomer (II) is in the range of 0.01 to 200 parts by weight.

2. The hydrophilic cured product as claimed in claim 1, wherein the mixture further contains a mono(meth)acrylate (I) having at least one anionic hydrophilic group selected from a sulfonic acid group, a carboxyl group and a phosphoric acid group, wherein the mono(meth)acrylate (I) is a mono (meth)acrylate represented by the following general formula (1):

$$[X]s[M1]l[M2]m \quad (1)$$

wherein s is 1 or 2, l is 1 or 2, m is 0 or 1, M1 and M2 are each a monovalent cation selected from a hydrogen ion, an ammonium ion, an amine ion and an alkaline metal ion, or an alkaline earth metal ion that is a divalent cation, and they may be the same or different, X is a hydrophilic anion represented by any one of the following general formulas (1-1) to (1-3):

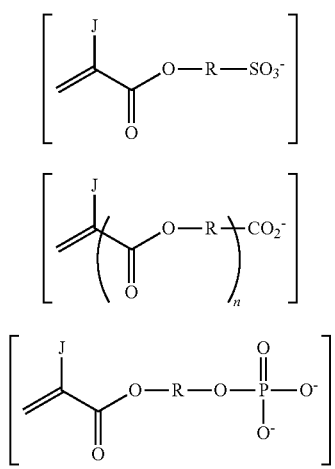

wherein J is H or $CH_3$ and may be the same or different, and n is 1, R is a hydrocarbon group of 1 to 600 carbon atoms which may contain an aromatic group, an alicyclic hydrocarbon group, an ether group or an ester group.

3. The hydrophilic cured product as claimed in claim 2, wherein the amount of the compound (IV) added based on 100 parts by weight of the total amount of the mono(meth) acrylate (I) and the polyvalent monomer (II) is in the range of 0.01 to 30 parts by weight.

4. A single-layer film formed from the hydrophilic cured product as claimed in claim 1.

5. The single-layer film as claimed in claim 4, wherein the degree of inclination (anion concentration ratio) (Sa/Da) of a surface concentration (Sa) of sulfonic acid groups, carboxyl groups and phosphoric acid groups that are anionic hydrophilic groups in the single-layer film to a deep part concentration (Da) of these anionic hydrophilic groups at the position of ½ of the film thickness of the single layer film is not less than 1.1.

6. The single-layer film as claimed in claim 4, which has a water contact angle of not more than 30°.

7. The single-layer film as claimed in claim 4, which has a water contact angle of not more than 10°.

8. The single-layer film as claimed in claim 4, which has a film thickness of 0.05 to 500 μm.

9. A process for producing a laminate including a single-layer film having an anionic hydrophilic group and formed on at least one surface of a substrate, comprising:

a step of preparing a mixture containing a polyvalent monomer (II) having two or more (meth)acryloyl groups, and a compound (IV), wherein the compound (IV) contained in the mixture is at least one compound selected from a group of compounds represented by the following general formulas (100), (200) and (300):

[Chem. 1]

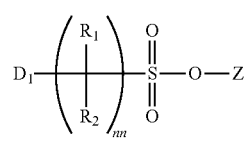

(100)

wherein $D_1$ is a mercapto group, an amino group, a methylamino group or an ethylamino group, Z is a hydrogen ion, an ammonium ion, an amine ion, an alkaline metal ion or ½ equivalent of an alkaline earth metal ion, $R_1$ and $R_2$ are each independently H, a methyl group, an ethyl group, a methoxy group or an ethoxy group, and nn is an integer of 1 to 10,

[Chem. 2]

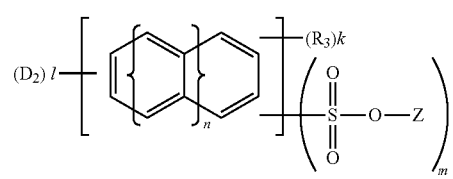

(200)

wherein $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or ½ equivalent of an alkaline earth metal ion, each $R_3$ is independently H, a methyl group, an ethyl group, a methoxy group, an ethoxy group, a fluorine atom, a chlorine atom, a bromine atom or an iodine atom, k is an integer of 0 to 10, l and m are each independently an integer of 1 to 11, k, l and m are numbers satisfying the condition of k+l+m=2 to 6+2n, and n is an integer of 0 to 3,

[Chem. 3]

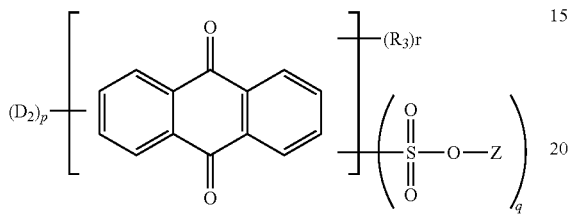

(300)

wherein $D_2$, $R_3$ and $SO_3Z$ are each a group bonded to carbon on a ring contained in the above formula, each $D_2$ is independently a mercapto group, an amino group, a methylamino group, an ethylamino group or a hydroxyl group, Z is a hydrogen ion, an ammonium ion, an amine ion, an alkaline metal ion or ½ equivalent of an alkaline earth metal ion, each $R_3$ is independently H, a methyl group, an ethyl group, a methoxy group, an ethoxy group, a fluorine atom, a chlorine atom, a bromine atom or an iodine atom, r is an integer of 0 to 6, q and p are each independently an integer of 1 to 7, and p, q and r are numbers satisfying the condition of p+q+r=an integer of 2 to 8, and the amount of the compound (IV) added based on 100 parts by weight of the polyvalent monomer (II) is in the range of 0.01 to 200 parts by weight, and contains a solvent containing a compound having a solubility parameter σ of not less than 9.3 (cal/cm³), a step of applying the mixture to at least one surface of a substrate, a step of removing at least a part of the solvent from the mixture applied, and a step of polymerizing the mixture having passed through the above steps.

* * * * *